(12) United States Patent
Tanabe

(10) Patent No.: US 9,379,570 B2
(45) Date of Patent: Jun. 28, 2016

(54) POWER SUPPLY APPARATUS, METHOD, AND STORAGE MEDIUM TO OUTPUT WIRELESS POWER AND CHARGE BASED ON VALUE RELATING TO OUTPUT POWER AND EFFICIENCY

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 859 days.

(21) Appl. No.: 13/368,181

(22) Filed: Feb. 7, 2012

(65) Prior Publication Data

US 2012/0205988 A1 Aug. 16, 2012

(30) Foreign Application Priority Data

Feb. 10, 2011 (JP) .................................. 2011-027539

(51) Int. Cl.
*H02J 17/00* (2006.01)
*H02J 7/02* (2016.01)

(52) U.S. Cl.
CPC ........................................ *H02J 7/025* (2013.01)

(58) Field of Classification Search
CPC .................................. H02J 5/00; H02J 7/025
USPC ............................................................ 307/104
See application file for complete search history.

(56) References Cited

U.S. PATENT DOCUMENTS

| | | | |
|---|---|---|---|
| 7,024,232 B2 * | 4/2006 | Ponce De Leon et al. . | 455/575.5 |
| 2003/0076168 A1 | 4/2003 | Forrester | |
| 2009/0127936 A1 | 5/2009 | Kamijo | |
| 2009/0133942 A1 * | 5/2009 | Iisaka et al. ...................... | 178/43 |
| 2009/0224723 A1 * | 9/2009 | Tanabe .......................... | 320/108 |
| 2009/0322280 A1 | 12/2009 | Kamijo | |
| 2010/0244579 A1 | 9/2010 | Sogabe | |
| 2011/0270462 A1 | 11/2011 | Amano | |
| 2012/0175967 A1 * | 7/2012 | Dibben et al. ................. | 307/104 |

FOREIGN PATENT DOCUMENTS

| | | |
|---|---|---|
| CN | 101442221 A | 5/2009 |
| CN | 101572423 A | 11/2009 |
| CN | 101667754 A | 3/2010 |
| CN | 101795022 A | 8/2010 |
| JP | 2001-275266 A | 10/2001 |
| JP | 2001309578 A | 11/2001 |
| JP | 2009124889 A | 6/2009 |
| JP | 2009219177 A | 9/2009 |
| JP | 2010119246 A | 5/2010 |
| JP | 2010252498 A | 11/2010 |
| JP | 2010252624 A | 11/2010 |
| KR | 100971705 B1 | 7/2010 |

* cited by examiner

*Primary Examiner* — Rexford Barnie
*Assistant Examiner* — Toan Vu
(74) *Attorney, Agent, or Firm* — Canon USA, Inc., IP Division

(57) ABSTRACT

A power supply apparatus includes a power supply unit that outputs power to an electronic apparatus, and a control unit that determines whether a predetermined object is detected. The control unit controls the power supply unit to output power that is less than a predetermined value if the predetermined object is detected, and the predetermined object does not include a chargeable object.

23 Claims, 13 Drawing Sheets

POWER SUPPLY APPARATUS, METHOD, AND STORAGE MEDIUM TO OUTPUT WIRELESS POWER AND CHARGE BASED ON VALUE RELATING TO OUTPUT POWER AND EFFICIENCY

BACKGROUND OF THE INVENTION

1. Field of the Invention

The present invention relates to a power supply apparatus that wirelessly supplies power, a method, and a storage medium.

2. Description of the Related Art

As discussed in Japanese Patent Application Laid-Open No. 2001-275266, a conventional power supply system includes a power supply apparatus having a primary coil that can output power wirelessly without using any connector and an electronic apparatus having a secondary coil that can wirelessly receive the power supplied from the power supply apparatus.

In the above-described conventional power supply system, the electronic apparatus can charge a battery while the power is supplied from the power supply apparatus via the secondary coil.

The conventional power supply apparatus supplies power to the electronic apparatus via the primary coil. The electronic apparatus receives the power supplied from the power supply apparatus via the secondary coil.

However, if a foreign object (e.g., a metal device) exists between the primary coil and the secondary coil, the power supply apparatus cannot supply power appropriately to the electronic apparatus due to influence of the foreign object.

To eliminate the above-described problem, when the power supply apparatus supplies power to an electronic apparatus, the power supply apparatus is required to determine whether a foreign object exists in the vicinity of the primary coil and control the power supplied to the electronic apparatus based on whether the foreign object exists.

SUMMARY OF THE INVENTION

One aspect of the present invention is directed to a power supply apparatus that can detect a foreign object and perform power supply process appropriately based on whether the foreign object exists.

According to an aspect of the present invention, a power supply apparatus includes a power supply unit that wirelessly outputs power to an electronic apparatus, and a control unit that determines whether a predetermined object is detected based on at least one of first information and second information, wherein the control unit controls the power supply unit to output power that is less than a predetermined value if the predetermined object is detected, the predetermined object does not include a chargeable object, the first information indicates a change of reflection corresponding to power outputted by the power supply unit, and the second information indicates power received by the electronic apparatus from the power supply apparatus.

According to another aspect of the present invention, a method for controlling a power supply apparatus is provided. The power supply apparatus includes a power supply unit that wirelessly outputs power to an electronic apparatus. The method includes determining whether a predetermined object is detected based on at least one of first information and second information, and outputting power that is less than a predetermined value if the predetermined object is detected, wherein the predetermined object does not include a chargeable object, and the first information indicates a change of reflection corresponding to power outputted by the power supply unit, and the second information indicates power received by the electronic apparatus from the power supply apparatus.

According to yet another aspect of the present invention, a computer-readable storage medium storing a program executed by a computer to perform a method for controlling a power supply apparatus. The power supply apparatus includes a power supply unit that wirelessly outputs power to an electronic apparatus. The method includes determining whether a predetermined object is detected based on at least one of first information and second information, and outputting power that is less than a predetermined value if the predetermined object is detected, wherein the predetermined object does not include a chargeable object, and the first information indicates a change of reflection corresponding to power outputted by the power supply unit, and the second information indicates power received by the electronic apparatus from the power supply apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
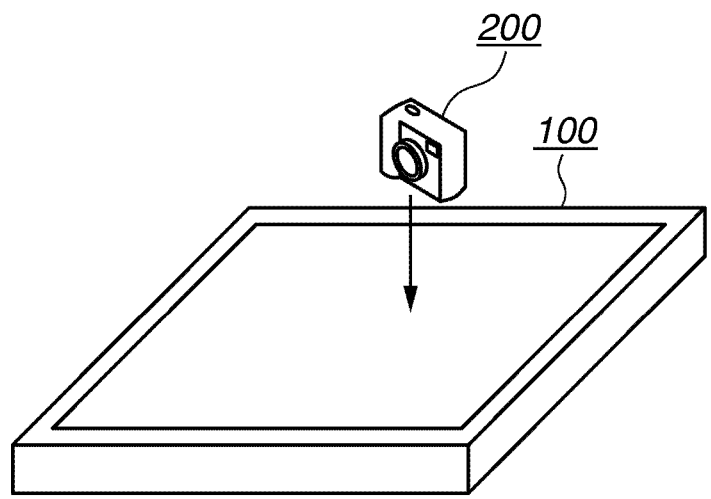
FIG. 1 illustrates an example of a power supply system according to first and second exemplary embodiments.

A power supply system according to a first exemplary embodiment of the present invention includes a power supply apparatus 100 and an electronic apparatus 200 as illustrated in FIG. 1. In the power supply system according to the first exemplary embodiment, the power supply apparatus 100 can supply power wirelessly to the electronic apparatus 200 via a power supply antenna 108 (see FIG. 2) when the electronic apparatus, 200 is placed on the power supply apparatus 100 as illustrated in FIG. 1.

Further, in a case where the distance between the power supply apparatus 100 and the electronic apparatus 200 is in a predetermined range, the electronic apparatus 200 including a power receiving antenna 201 (see FIG. 2) can receive power wirelessly from the power supply apparatus 100 via the power receiving antenna 201.

Further, the electronic apparatus 200 can charge a battery 210 (see FIG. 2) attached to the electronic apparatus 200 while power is received from the power supply apparatus 100 via the power receiving antenna 201. Further, in a case where the distance between the power supply apparatus 100 and the electronic apparatus 200 is not within the predetermined range, the electronic apparatus 200 cannot receive any power from the power supply apparatus 100 via the power receiving antenna 201.

The above-described predetermined range is a range in which the electronic apparatus 200 can communicate with the power supply apparatus 100 based on power supplied from the power supply apparatus 100.

In the present exemplary embodiment, the power supply apparatus 100 can wirelessly and simultaneously supply power to a plurality of electronic apparatuses.

The electronic apparatus 200 can be any electronic apparatus that can perform various operations using power supplied from the battery 210. For example, the electronic apparatus 200 is an image capture apparatus (e.g., a digital still camera, a cellular phone with a camera, a digital video camera, or the like) or a reproduction apparatus (e.g., player) that can reproduce audio data or video data. Further, the electronic apparatus 200 can be a mobile apparatus, such as a vehicle and more particularly an automobile, which can be driven by using the power supplied from the battery 210.

Further, the electronic apparatus 200 can be an electronic apparatus capable of performing various operations by using power supplied from the power supply apparatus 100 even if the battery 210 is not attached.

Figure 2:
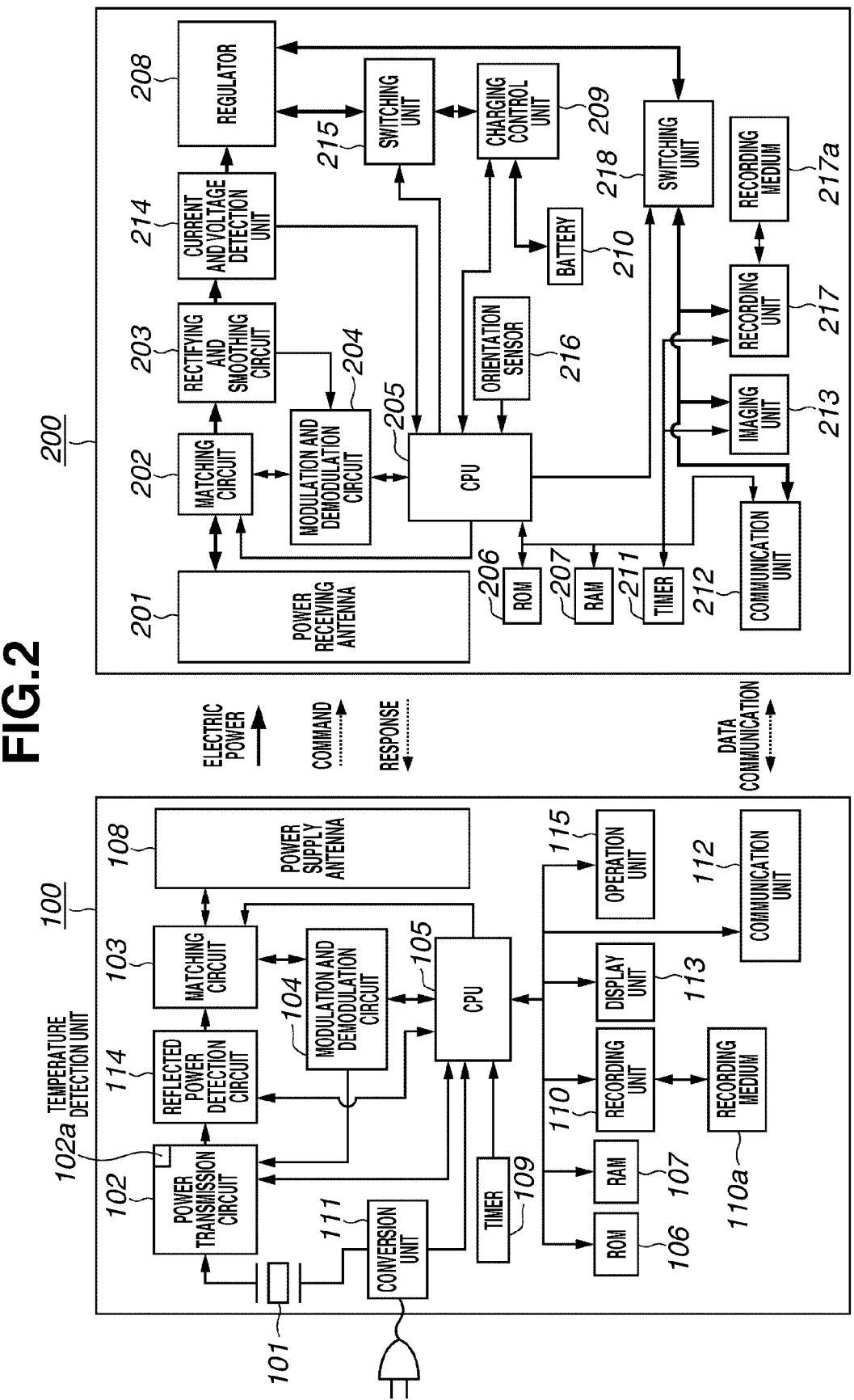
FIG. 2 is a block diagram illustrating an example of the power supply system according to the first and second exemplary embodiments.

FIG. 2 is a block diagram illustrating a power supply system that includes the power supply apparatus 100 and the electronic apparatus 200.

As illustrated in FIG. 2, the power supply apparatus 100 includes an oscillator 101, a power transmission circuit 102, a matching circuit 103, a modulation and demodulation circuit 104, a central processing unit (CPU) 105, a read only memory (ROM) 106, a random access memory (RAM) 107, the power supply antenna 108, a timer 109, a recording unit 110, and a conversion unit 111. Further, as illustrated in FIG. 2, the power supply apparatus 100 includes a communication unit 112, a display unit 113, a reflected power detection circuit 114, and an operation unit 115.

The oscillator 101 can generate high-frequency oscillation that can be used to convert power supplied from an AC power source (not illustrated) via the conversion unit 111 into power corresponding to a target value set by the CPU 105, which can be supplied to the electronic apparatus 200. For example, the oscillator 101 is constituted by a crystal oscillator.

The power transmission circuit 102 generates power to be supplied to the electronic apparatus 200 via the power supply antenna 108 based on the power supplied from the conversion unit 111 and the frequency of oscillation by the oscillator 101. The power transmission circuit 102 includes a field effect transistor (FET), and generates the power to be supplied to the electronic apparatus 200 by controlling the current flowing between source and drain terminals of the FET based on the frequency of oscillation by the oscillator 101. The power generated by the power transmission circuit 102 is supplied to the matching circuit 103 via the reflected power detection circuit 114.

The power generated by the power transmission circuit 102 includes first power, second power, and third power.

The first power is electric power to be required when the power supply apparatus 100 transmits a control command to the electronic apparatus 200. The second power is electric power to be required when the power supply apparatus 100 performs power supply preparation process. The third power is electric power to be supplied to the electronic apparatus 200 when the power supply apparatus 100 supplies power to the electronic apparatus 200. For example, the first power is equal to or less than 1 W. The second power is in a range from 2 W to 5 W. The third power is in a range from 5 W to 10 W.

The first power is lower than the second power and the third power. Further, the third power is equal to or greater than the second power.

When the power supply apparatus 100 is supplying the first power to the electronic apparatus 200, the power supply apparatus 100 can transmit a command to the electronic apparatus 200. However, when the power supply apparatus 100 is supplying one of the second power and the third power to the electronic apparatus 200, the power supply apparatus 100 cannot transmit any command to the electronic apparatus 200.

Further, the CPU 105 can set the first power appropriately so that the power supply apparatus 100 can transmit a command to any apparatus other than the electronic apparatus 200.

The CPU 105 controls the power transmission circuit 102 so as to switch the power to be supplied to the electronic apparatus 200 to one of the first power, the second power, and the third power.

Further, the power transmission circuit 102 includes a temperature detection unit 102a that detects the temperature of the power transmission circuit 102.

The temperature detection unit 102a detects the temperature of the FET included in the power transmission circuit 102 and supplies an FET temperature detection result, as temperature information indicating the temperature of the power supply apparatus 100, to the CPU 105. The CPU 105 records the temperature information supplied from the temperature detection unit 102a in the RAM 107. Further, the CPU 105 determines whether the temperature of the power supply apparatus 100 is normal based on the temperature information supplied from the temperature detection unit 102a.

The matching circuit 103 is a resonance circuit for causing the power supply antenna 108 to resonate with a power receiving antenna of a power supply target apparatus selected by the CPU 105 based on the frequency of oscillation by the oscillator 101.

Figure 3:
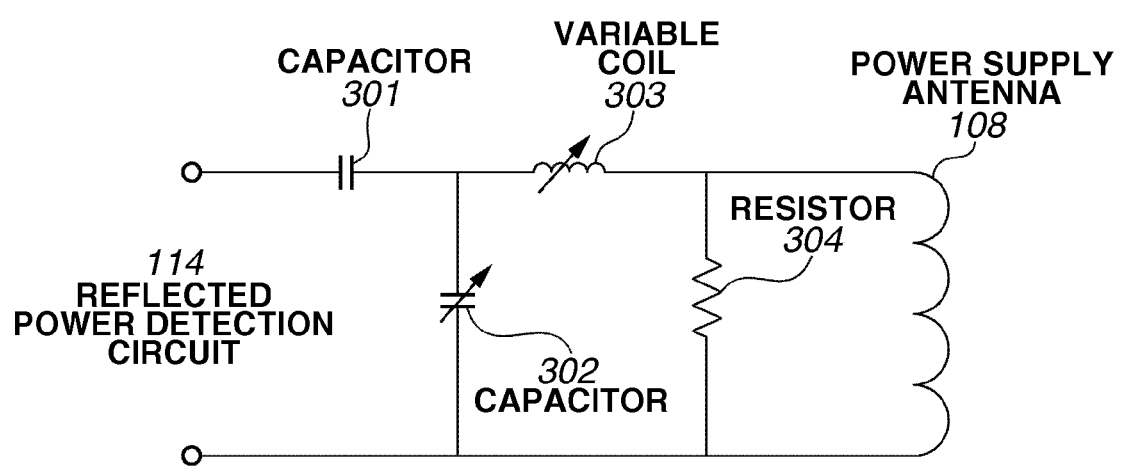
FIG. 3 illustrates an example of a matching circuit of the power supply apparatus according to the first and second exemplary embodiments.

FIG. 3 illustrates an example configuration of the matching circuit 103. As illustrated in FIG. 3, the matching circuit 103 includes a capacitor 301, a variable capacitor 302, a variable coil 303, and a resistor 304. The matching circuit 103 matches impedance between the power transmission circuit 102 and the power supply antenna 108 using the above-described circuit elements.

The CPU 105 controls values of the variable capacitor 302 and the variable coil 303 to adjust the frequency of oscillation by the oscillator 101 to a resonance frequency f. The resonance frequency f is a frequency used for resonating between the power supply apparatus 100 and a power supply target apparatus to which the power supply apparatus 100 supplies power.

The frequency used for resonating between the power supply apparatus 100 and the power supply target apparatus is hereinafter referred to as "resonance frequency f."

The following numerical formula (1) defines the resonance frequency f, in which L indicates an inductance of the matching circuit 103 and C indicates a capacitance of the matching circuit 103.

$$f = \frac{1}{2\pi\sqrt{LC}} \quad (1)$$

The capacitor 301 and the variable capacitor 302 are capacitors provided for the impedance matching. Further, the variable capacitor 302 is usable to set the frequency of oscillation by the oscillator 101 to be equal to the resonance frequency f defined by numerical formula (1).

The variable coil 303 is a coil usable to set the frequency of oscillation by the oscillator 101 to be equal to the resonance frequency f defined by numerical formula (1).

The matching circuit 103 can include another capacitor in addition to the capacitor 301 and the variable capacitor 302, and can include another coil in addition to the variable coil 303. Further, the matching circuit 103 can include another resistor in addition to the resistor 304.

As described above, the CPU 105 sets the frequency of oscillation by the oscillator 101 to be the resonance frequency f by controlling the setting values of the variable capacitor 302 and the variable coil 303. However, the CPU 105 can employ any other method to set the frequency of oscillation by the oscillator 101 to be the resonance frequency f.

For example, the CPU 105 may set the frequency of oscillation by the oscillator 101 to be equal to the resonance frequency f by switching a connection a capacitor included in the matching circuit 103 and a coil included in the matching circuit 103.

The resonance frequency f can be the commercial frequency (i.e., 50/60 Hz) or can be in a range from 10 kHz to several hundreds kHz, or can be a higher frequency of about 10 MHz.

Further, the matching circuit 103 can detect a change of current flowing to the power supply antenna 108 and a change of the voltage supplied to the power supply antenna 108.

In a state where the frequency of oscillation by the oscillator 101 is set to be equal to the resonance frequency f, the power generated by the power transmission circuit 102 is supplied to the power supply antenna 108 via the matching circuit 103.

The modulation and demodulation circuit 104 modulates the power generated by the power transmission circuit 102 according to a predetermined protocol to transmit a command for controlling the electronic apparatus 200 to the electronic apparatus 200. The predetermined protocol is, for example, communication protocol that conforms to the ISO/IEC 18092 standards, such as Radio Frequency Identification (RFID). The power generated by the power transmission circuit 102 is converted into a pulse signal by the modulation and demodulation circuit 104 and the pulse signal is transmitted to the electronic apparatus 200 via the feed antenna 108 as a command to be used to communicate with the electronic apparatus 200.

The electronic apparatus 200 analyzes the pulse signal transmitted from the power supply apparatus 100 and detects a bit data including "1" information and "0" information. The command includes identification information required to identify an address and a command code indicating an operation to be instructed by the command. The CPU 105 can transmit the command to the electronic apparatus 200 by controlling the modulation and demodulation circuit 104 in such a way as to change the identification information included in the command.

Further, the CPU 105 can transmit the command to the electronic apparatus 200 and an apparatus other than the electronic apparatus 200 by controlling the modulation and demodulation circuit 104 in such a way as to change the identification information included in the command.

The modulation and demodulation circuit 104 converts the power generated by the power transmission circuit 102 into a pulse signal based on Amplitude Shift Keying (ASK) modulation. The ASK modulation is s modulation using amplitude displacement. The ASK modulation is used for an IC card and a card reader that perform wireless communications.

The modulation and demodulation circuit 104 changes the amplitude of the power generated by the power transmission circuit 102 by switching an analog multiplier and a load resistor included in the modulation and demodulation circuit 104 and generates the pulse signal. The pulse signal generated by the modulation and demodulation circuit 104 is supplied to the power supply antenna 108 and transmitted, as a command, to the electronic apparatus 200.

Further, the modulation and demodulation circuit 104 includes a coding circuit that executes coding based on a predetermined coding method.

The modulation and demodulation circuit 104 can cause the coding circuit to demodulate a response received from the electronic apparatus 200 corresponding to the command transmitted to the electronic apparatus 200, based on a change of the current flowing to the power supply antenna 108 detected by the matching circuit 103. Thus, the modulation and demodulation circuit 104 can receive, from the electronic apparatus 200, a response corresponding to the command transmitted to the electronic apparatus 200 based on the load modulation method. The modulation and demodulation circuit 104 transmits a command to the electronic apparatus 200 based on an instruction from the CPU 105. Further, if a response is received from the electronic apparatus 200, the modulation and demodulation circuit 104 demodulates the received response and supplies the demodulated response to the CPU 105.

In a state where the AC power source (not illustrated) is connected to the power supply apparatus 100, the CPU 105 can control each unit of the power supply apparatus 100 by using power supplied from the AC power source (not illustrated) via the conversion unit 111. Further, the CPU 105 can execute a computer program stored in the ROM 106 to control respective units of the power supply apparatus 100. The CPU 105 can control the power supplied to the electronic apparatus 200 by controlling the power transmission circuit 102. Further, the CPU 105 can transmit a command to the electronic apparatus 200 by controlling the modulation and demodulation circuit 104.

The ROM 106 stores the computer program required to control operations to be performed by respective units of the power supply apparatus 100 and parameters relating to the operations of respective units. Further, the ROM 106 can store video data to be displayed on the display unit 113. Further, the ROM 106 stores a management table that includes identification information of each electronic apparatus which is supplied power from the power supply apparatus 100.

The identification information recorded in the management table is identification information of a predetermined apparatus. Therefore, the electronic apparatus corresponding to the identification information recorded in the management table is the predetermined apparatus. The predetermined apparatus is an apparatus that includes a unit capable of receiving power from the power supply apparatus 100 and a unit capable of transmitting a response corresponding to a command transmitted from the power supply apparatus 100 to the power supply apparatus 100. The predetermined apparatus performs normal operations based on power supplied from the power supply apparatus 100.

The RAM 107 is a rewritable nonvolatile memory, which can temporarily store the computer program required to control operations to be performed by respective units of the power supply apparatus 100, parameters relating to the operations of respective units, and information transmitted from the electronic apparatus 200 to the modulation and demodulation circuit 104.

The power supply antenna 108 is an antenna capable of outputting the power generated by the power transmission circuit 102 to an external device.

The power supply apparatus 100 supplies power and transmits a command to the electronic apparatus 200 via the power supply antenna 108. Further, the power supply apparatus 100 receives a command from the electronic apparatus 200 via the power supply antenna 108, a response corresponding to a command transmitted to the electronic apparatus 200, and information transmitted from the electronic apparatus 200.

The timer 109 measures the present time and can obtain time information relating to an operation or process performed by each unit. Further, a threshold value relating to the time measured by the timer 109 is stored beforehand in the ROM 106.

The recording unit 110 records video data and audio data received by the communication unit 112, on a recording medium 110*a*.

Further, the recording unit 110 can read the recorded data (i.e., video data and audio data) from the recording medium 110*a* and can supply the readout data to the RAM 107, the communication unit 112, and the display unit 113.

For example, the recording medium 110*a* is a hard disk or a memory card, and can be a built-in medium provided in the power supply apparatus 100, or can be an external recording medium that is attachable to or detachable from the power supply apparatus 100.

In a state where the AC power source (not illustrated) is connected to the power supply apparatus 100, the conversion unit 111 can convert alternating-current power supplied from the AC power source (not illustrated) into direct-current power and can supply the converted direct-current power to each unit of the power supply apparatus 100.

The communication unit 112 transmits video data and audio data supplied from any one of the RAM 107 and the recording medium 110*a* to the electronic apparatus 200. Further, the communication unit 112 receives video data and audio data transmitted from the electronic apparatus 200 to the power supply apparatus 100.

For example, the communication unit 112 can perform communications via a serial bus interface, such as Universal Serial Bus (USB). Further, for example, the communication unit 112 can communicate via an appropriate interface, such as High-Definition Multimedia Interface (HDMI®). Further, the communication unit 112 can perform communications according to wireless communication method. Further, for example, the communication unit 112 can perform wireless communications according to 802.11a, b, g, n standards regulated in the wireless LAN standards. Further the communication unit 112 can modulate video data or audio data into a signal conforming to the wireless LAN standards and perform a transmission of the modulated signal and a reception of the modulated signal.

The communication unit 112 can receive video data and audio data from the electronic apparatus 200 or transmit video data and audio data to the electronic apparatus 200 even if a command is transmitted to the electronic apparatus 200 via the power supply antenna 108 by the modulation and demodulation circuit 104. Further, the communication unit 112 can receive video data and audio data from the electronic apparatus 200 or transmit video data and audio data to the electronic apparatus 200 even if a response corresponding to a command from the electronic apparatus 200 is received via the power supply antenna 108 by the modulation and demodulation circuit 104.

The display unit 113 can display any one of video data read from the recording medium 110*a* via the recording unit 110, video data supplied from the RAM 107, video data supplied from the ROM 106, and video data supplied from the communication unit 112. The display unit 113 can display icons and menu screens stored beforehand in the ROM 106.

The reflected power detection circuit 114 can detect first current information indicating a current value of the power generated by the power transmission circuit 102 and first voltage information indicating a voltage value of the power generated by the power transmission circuit 102. If the power generated by the power transmission circuit 102 is the first power, the first current information indicates a current value of the first power and the first voltage information indicates a voltage value of the first power.

Further, if the power generated by the power transmission circuit 102 is the second power, the first current information indicates a current value of the second power and the first voltage information indicates a voltage value of the second power. Further, if the power generated by the power transmission circuit 102 is the third power, the first current information indicates a current value of the third power and the first voltage information indicates a voltage value of the third power.

The reflected power detection circuit 114 can detect information indicating amplitude voltage V1 of a traveling wave of the power output via the power supply antenna 108 and information indicating amplitude voltage V2 of a reflected wave of the power output via the power supply antenna 108.

The reflected power detection circuit 114 supplies the detected information (i.e., the first current information, the first voltage information, the information indicating the amplitude voltage V1, and the information indicating the amplitude voltage V2) to the CPU 105.

The CPU 105 receives the information supplied from the reflected power detection circuit 114 and records the received information in the RAM 107.

Figure 4:
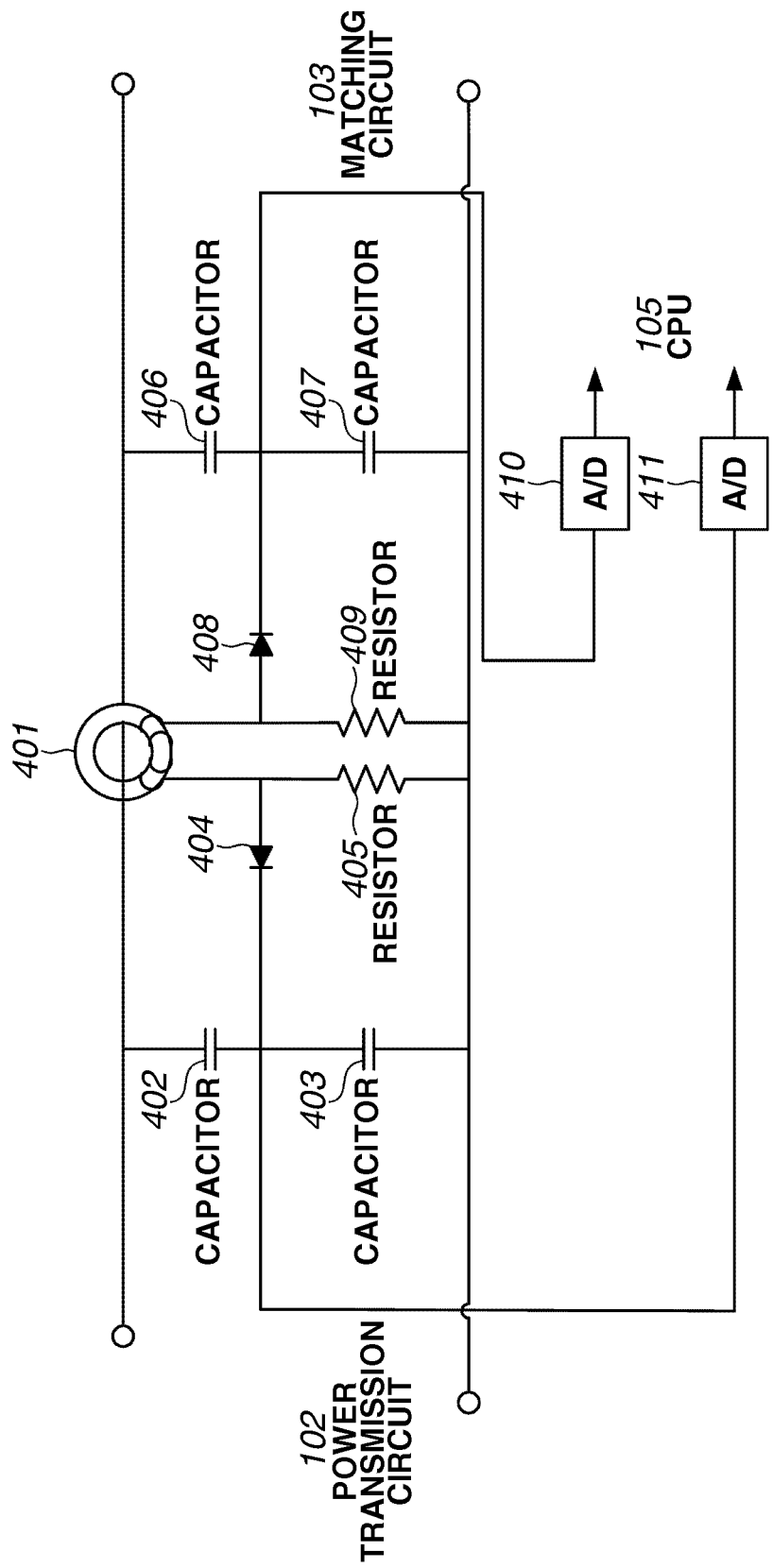
FIG. 4 illustrates an example configuration of a reflected power detection circuit of the power supply apparatus according to the first and second exemplary embodiments.

FIG. 4 illustrates an example configuration of the reflected power detection circuit 114.

As illustrated in FIG. 4, the reflected power detection circuit 114 includes a toroidal core 401, a capacitor 402, a capacitor 403, a diode 404, a resistor 405, a capacitor 406, a capacitor 407, a diode 408, and a resistor 409. Further, the reflected power detection circuit 114 includes an analog/digital (A/D) convertor 410 and an A/D convertor 411.

The reflected power detection circuit 114 detects, by using the CM (inductive and capacitive) coupling, the traveling wave of the power output via the power supply antenna 108 as a voltage supplied to the capacitor 407. Further, the A/D convertor 410 of the reflected power detection circuit 114 changes the detected analog voltage value of the capacitor 407 into a digital voltage value and supplies the converted voltage data to the CPU 105.

The reflected power detection circuit 114 detects, by using the CM coupling, the reflected wave of the power output via the power supply antenna 108 as a voltage supplied to the capacitor 403. Further, the A/D convertor 411 changes the detected analog voltage value of the capacitor 403 into a digital voltage value and supplies the converted voltage data to the CPU 105.

The toroidal core 401 is provided for the inductive coupling. The capacitor 402 and the capacitor 406 are provided for the capacitive coupling.

The CPU 105 detects the voltage supplied the A/D convertor 410 as the amplitude voltage V1 of the traveling wave. The CPU 105 detects the voltage supplied from the A/D convertor 411 as the amplitude voltage V2 of the reflected wave. The CPU 105 acquires a voltage reflection coefficient ρ based on the amplitude voltage V1 of the traveling wave and the amplitude voltage V2 of the reflected wave. Further, the CPU 105 calculates a voltage standing wave ratio (VSWR) based on the voltage reflection coefficient ρ.

The VSWR is a value indicating a relationship between the traveling wave of the power output via the feed antenna 108 and the reflected wave of the power output via the power supply antenna 108. When a value of VSWR is approximates to 1, the reflected power is small and the loss of the power supplied from the power supply apparatus 100 to an external electronic apparatus is small, and the efficiency is higher.

The following numerical formula (2) defines the voltage reflection coefficient ρ.

$$\rho = \frac{V2}{V1} \quad (2)$$

The following numerical formula (3) defines VSWR.

$$VSWR = \frac{1+\rho}{1-\rho} \quad (3)$$

The operation unit 115 provides a user interface that enables users to operate the power supply apparatus 100. The operation unit 115 includes a power button that is usable to activate the power supply apparatus 100 and a mode switching button that is usable to switch the operation mode of the power supply apparatus 100. Each button can be constituted by a switch or a touch panel. The CPU 105 controls the power supply apparatus 100 according to a user instruction input via the operation unit 115. The operation unit 115 can be configured to control the power supply apparatus 100 according to a remote-control signal received from a remote controller (not illustrated).

The power supply apparatus 100 can be configured to include a speaker unit (not illustrated). The speaker unit (not illustrated) can output any one of audio data read from the recording medium 110a via the recording unit 110, audio data supplied from the ROM 106, audio data supplied from the RAM 107, and audio data supplied from the communication unit 112.

The power supply apparatus 100 includes a first power supply mode and a second power supply mode, as operation modes. The first power supply mode is a power supply mode in which the power supply apparatus 100 can transmit one of the first power and the third power to the electronic apparatus 200. The second power supply mode is a power supply mode in which the power supply apparatus 100 can transmit video data and audio data to the electronic apparatus 200 via the communication unit 112 and receive video data and audio data from the electronic apparatus 200 via the communication unit 112 while transmitting one of the first power and the third power to the electronic apparatus 200.

Units including at least one of the power transmission circuit 102, the matching circuit 103, the modulation and demodulation circuit 104, and the power supply antenna 108 are indicated as a "first communication unit." The communication unit 112 is indicated as a "second communication unit."

When the power supply apparatus 100 supplies power to the electronic apparatus 200, one of the first power, the second power, and the third power is transmitted to the electronic apparatus 200 by the first communication unit.

When the power supply apparatus 100 transmits a command to the electronic apparatus 200, the first power and the command are transmitted to the electronic apparatus 200 by the first communication unit.

When the power supply apparatus 100 transmits at least one of video data and audio data to the electronic apparatus 200, the second communication unit transmits at least one of the video data and the audio data to the electronic apparatus 200.

If the power supply apparatus 100 receives at least one of video data and audio data from the electronic apparatus 200, the second communication unit receives at least one of the video data and the audio data from the electronic apparatus 200.

Next, an example configuration of the electronic apparatus 200 is described in detail below with reference to FIG. 2.

An example of the electronic apparatus 200 is a digital still camera.

The electronic apparatus 200 includes the power receiving antenna 201, a matching circuit 202, a rectifying and smoothing circuit 203, a modulation and demodulation circuit 204, a CPU 205, a ROM 206, a RAM 207, a regulator 208, a charging control unit 209, the battery 210, and a timer 211. Further, the electronic apparatus 200 includes a communication unit 212, an imaging unit 213, a current and voltage detection unit 214, a switching unit 215, an orientation sensor 216, a recording unit 217, and a switching unit 218.

The power receiving antenna 201 is an antenna capable of receiving power supplied from the power supply apparatus 100. The electronic apparatus 200 can receive power from the power supply apparatus 100 and can receive a command via the power receiving antenna 201. Further, the electronic apparatus 200 can transmit a command for controlling the power supply apparatus 100 to the power supply apparatus 100 and transmit a response corresponding to a command received from the power supply apparatus 100, via the power receiving antenna 201.

The matching circuit 202 is a resonance circuit for matching the impedance to cause the power receiving antenna 201 to resonate by using a frequency similar to the resonance frequency f of the power supply apparatus 100. Similar to the matching circuit 103, the matching circuit 202 includes a capacitor, a coil, a variable capacitor, a variable coil, and a resistor. The matching circuit 202 controls a capacitance value of the variable capacitor, an inductance value of the variable coil, and an impedance value of the variable resistor in such a way as to cause the power receiving antenna 201 to resonate by using a frequency similar to the resonance frequency f of the power supply apparatus 100.

Further, the matching circuit 202 can supply power received via the power receiving antenna 201 to the rectifying and smoothing circuit 203.

The rectifying and smoothing circuit 203 can generate direct-current power by extracting a command from the power received via the power receiving antenna 201 and removing noises from the power received via the power receiving antenna 201. Further, the rectifying and smoothing circuit 203 can supply the generated direct-current power to the regulator 208 via the current and voltage detection unit 214. The rectifying and smoothing circuit 203 supplies the command extracted from the power received via the power receiving antenna 201 to the modulation and demodulation circuit 204. The rectifying and smoothing circuit 203 includes rectifying diodes to generate the direct-current power through full-wave rectification or half-wave rectification. The direct-current power generated by the rectifying and smoothing circuit 203 can be supplied to the regulator 208.

The modulation and demodulation circuit 204 analyzes the command supplied from the rectifying and smoothing circuit 203 according to communication protocol determined beforehand in relation to the power supply apparatus 100, and supplies a command analysis result to the CPU 205.

In a state where power is supplied from the power supply apparatus 100 to the electronic apparatus 200, the CPU 205 controls the modulation and demodulation circuit 204 so as to change a load included in the modulation and demodulation circuit 204 to transmit a command, a response replying to a command, and predetermined information to the power supply apparatus 100. When the load included in the modulation and demodulation circuit 204 changes, the current flowing to the power supply antenna 108 changes. Thus, the power supply apparatus 100 can receive a command, a response replying to a command, and predetermined information transmitted from the electronic apparatus 200 by detecting a change of the current flowing to the power supply antenna 108.

The CPU 205 identifies the command received by the modulation and demodulation circuit 204 based on the analysis result supplied from the modulation and demodulation circuit 204 and controls the electronic apparatus 200 so as to perform an operation or a process designated by a command code that corresponds to the received command.

Further, the CPU 205 executes a computer program stored in the ROM 206 to control operations of the electronic apparatus 200.

The ROM 206 stores the computer program required to control operations of the electronic apparatus 200 and parameters relating to the operations of the electronic apparatus 200. Further, the ROM 206 stores identification information of the electronic apparatus 200, device information of the electronic apparatus 200, and display data.

The identification information of the electronic apparatus 200 indicates ID of the electronic apparatus 200. The device information of the electronic apparatus 200 includes manufacturer name of the electronic apparatus 200, apparatus name of the electronic apparatus 200, manufacturing date of the electronic apparatus 200, orientation information detected by the orientation sensor 216, and power receiving information of the electronic apparatus 200.

The power receiving information of the electronic apparatus 200 includes information indicating a maximum power that the electronic apparatus 200 can receive, information indicating a minimum power that the electronic apparatus 200 can receive, and information indicating power required when the electronic apparatus 200 communicates with the power supply apparatus 100 by using a command.

Further, the power receiving information of the electronic apparatus 200 includes information indicating power required when the electronic apparatus 200 causes the communication unit 212 to perform operations, information indicating power required when the electronic apparatus 200 performs charging, and information indicating power required when the electronic apparatus 200 causes the imaging unit 213 to perform operations. Further, the power receiving information of the electronic apparatus 200 includes information indicating power required when the electronic apparatus 200 causes the recording unit 217 to perform operations.

Further, the ROM 206 stores a threshold value that relates to an efficiency indicating a ratio of the power received by the electronic apparatus 200 to the power supplied from the power supply apparatus 100.

In the present exemplary embodiment, the efficiency indicating the ratio of the power received by the electronic apparatus 200 to the power supplied from the power supply apparatus 100 is hereinafter referred to as "power supply efficiency."

The RAM 207 is a rewritable nonvolatile memory, which can temporarily store the computer program required to control operations to be performed by the power supply apparatus 100, parameters relating to the operations of the electronic apparatus 200, and information transmitted from the power supply apparatus 100.

The regulator 208 controls one of the voltage of the direct-current power supplied from the rectifying and smoothing circuit 203 and the voltage of the power supplied from the battery 210 to be equal to the voltage value set by the CPU 205. The regulator 208 can be a switching regulator or a linear regulator.

In a state where power can be supplied from the power supply apparatus 100 although no power is supplied from the battery 210, the regulator 208 supplies the direct-current power received from the rectifying and smoothing circuit 203 to the charging control unit 209 and the battery 210 via the switching unit 215.

Further, in a state where power can be supplied from the power supply apparatus 100 although no power is supplied from the battery 210, the regulator 208 supplies the direct-current power received from the rectifying and smoothing circuit 203 to the communication unit 212, the imaging unit 213, and the recording unit 217 via the switching unit 218.

In a state where power can be supplied from the battery 210 via the switching unit 215 although no power is supplied from the power supply apparatus 100, the regulator 208 supplies the power supplied from the battery 210 to the communication unit 212, the imaging unit 213, and the recording unit 217 via the switching unit 218.

In a state where power can be supplied from the power supply apparatus 100 and the battery 210, the regulator 208 supplies the direct-current power supplied from the rectifying and smoothing circuit 203 to the communication unit 212, the imaging unit 213, and the recording unit 217 via the switching unit 218. In this case, the power supplied from the battery 210 may be prevented from being supplied to the communication unit 212, the imaging unit 213, and the recording unit 217 via the switching unit 218 to prevent reducing a remaining capacity of battery 210.

In a state where power is supplied from at least one of the battery 210 and the power supply apparatus 100, the regulator 208 causes the supplied direct-current power to be further supplied to the CPU 205, the orientation sensor 216, the ROM 206, the RAM 207, and the timer 211. Further, in a state where power is supplied from at least one of the battery 210 and the power supply apparatus 100, the regulator 208 causes the supplied power to be further supplied to the modulation and demodulation circuit 204, the matching circuit 202, the rectifying and smoothing circuit 203, and the current and voltage detection unit 214.

If power is supplied from the regulator 208 via the switching unit 215, the charging control unit 209 charges the battery 210 by using the supplied power. In this case, the charging control unit 209 charges the battery 210 according to a constant-voltage and constant-current method. Further, the charging control unit 209 periodically detects information indicating a remaining capacity of the attached battery 210 and supplies the detected remaining capacity information to the CPU 205.

The information indicating the remaining capacity of the battery 210 is hereinafter referred to as "remaining capacity information."

The CPU 205 records charge information including the remaining capacity information in the RAM 207.

The charge information can include information indicating whether the battery 210 is in a full-charge state, and information indicating the time elapsed since the charging control unit 209 has started charging the battery 210, in addition to the remaining capacity information. Further, the charge information can include information indicating that the charging control unit 209 is charging the battery 210 according to constant-voltage control and information indicating that the charging control unit 209 is charging the battery 210 according to constant-current control.

Further, the charging control unit 209 obtains information indicating the current flowing to the battery 210 and the voltage supplied to the battery 210 when the charging control unit 209 is charging the battery 210. The charging control unit 209 supplies detected current and voltage information to the CPU 205. The CPU 205 records the current and voltage information received from the charging control unit 209 (i.e., the information indicating the current flowing to the battery 210 and the information indicating the voltage supplied to the battery 210) in the RAM 207.

The battery 210 is attachable to and detachable from the electronic apparatus 200. Further, the battery 210 is a chargeable secondary battery, such as a lithium ion battery. The battery 210 can supply power to the electronic apparatus 200.

The timer 211 measures the present time and can obtain time information relating to an operation or a process performed by each unit. Further, a threshold applicable to the time measured by the timer 211 is stored beforehand in the ROM 206.

The communication unit 212 can transmit video data and audio data stored in the ROM 206 or recorded on a recording medium 217a to the power supply apparatus 100 and can receive video data and audio data from the power supply apparatus 100. The communication unit 212 performs transmission and reception of video data and audio data according to communication protocol that is commonly applied to the communication unit 112. Further, for example, the communication unit 212 can transmit and receive video data and audio data according to 802.11a, b, g, n standards dedicated to the wireless LAN.

The imaging unit 213 includes an image sensor that can generate video data based on an optical image of an object to be captured, an image processing circuit that can perform image process on the video data generated by the image sensor, and a compression/decompression circuit that can compress video data and can decompress compressed video data. The imaging unit 213 performs a shooting operation to capture an image of an object, and supplies video data of a still image or a moving image obtained by the shooting operation to the recording unit 217. The recording unit 217 records the video data supplied from the imaging unit 213 on the recording medium 217a. The imaging unit 213 can further include any configuration required to perform a shooting operation.

The current and voltage detection unit 214 can detect second current information indicating a current value of the power supplied from the rectifying and smoothing circuit 203 and second voltage information indicating a voltage value of the power supplied from the rectifying and smoothing circuit 203.

The second current information and the second voltage information detected by the current and voltage detection unit 214 can be supplied to the CPU 205.

The CPU 205 stores, in the RAM 207, the second current information and the second voltage information received from the current and voltage detection unit 214.

The switching unit 215 is a switch that can connect the regulator 208 to the charging control unit 209. When the CPU 205 turns on the switching unit 215, the regulator 208 is connected to the charging control unit 209. When the CPU 205 turns off the switching unit 215, the regulator 208 is disconnected from the charging control unit 209.

If the switching unit 215 is ON in a state where the operation mode of the electronic apparatus 200 is a charge mode, the regulator 208 can supply the power from the rectifying and smoothing circuit 203 to the charging control unit 209 and the battery 210 via the switching unit 215. If the switching unit 215 is OFF in a state where the operation mode of the electronic apparatus 200 is the charge mode, the regulator 208 cannot supply the power from the rectifying and smoothing circuit 203 to the charging control unit 209 and the battery 210 via the switching unit 215.

If the switching unit 215 is ON in a state where the operation mode of the electronic apparatus 200 is other than the charge mode, the regulator 208 is received power from the battery 210 via the switching unit 215.

If the switching unit 215 is OFF in a state where the operation mode of the electronic apparatus 200 is other than the charge mode, the regulator 208 is not received any power from the battery 210 via the switching unit 215.

The switching unit 215 can be a relay switch or can be any available switch provided beforehand in the electronic apparatus 200.

The orientation sensor 216 is a sensor capable of detecting the orientation of the electronic apparatus 200. The orientation sensor 216 is, for example, a gyro sensor or an angular velocity sensor. In this case, the orientation sensor 216 detects an angular speed of the electronic apparatus 200 and obtains orientation information indicating the orientation of the electronic apparatus 200. The orientation information detected by the orientation sensor 216 can be supplied to the CPU 205.

The orientation information of the electronic apparatus 200 is angular information indicating an angle of a flat plane attached to the power receiving antenna 201 of the electronic apparatus 200 to a flat plane attached to the power supply antenna 108 of the power supply apparatus 100. Further, the orientation information of the electronic apparatus 200 can be any information other than the angular information of the electronic apparatus 200. For example, the orientation information of the electronic apparatus 200 can be movement information indicating a movement distance of the electronic apparatus 200.

The recording unit 217 records the video data and audio data supplied from any one of the communication unit 212 and the imaging unit 213 on the recording medium 217a.

Further, the recording unit 217 can read video data and audio data from the recording medium 217a and can supply the readout data to the RAM 207 and the communication unit 212.

For example, the recording medium 217a is a hard disk or a memory card, and can be a built-in medium provided in the electronic apparatus 200, or can be an external recording medium that is attachable to or detachable from the electronic apparatus 200.

The switching unit 218 is a switch that can connect the regulator 208 to the communication unit 212, the imaging unit 213, and the recording unit 217. When the CPU 205 turns on the switching unit 218, the regulator 208 is connected to the communication unit 212, the imaging unit 213, and the recording unit 217. When the CPU 205 turns off the switching unit 218, the regulator 208 is disconnected from the communication unit 212, the imaging unit 213, and the recording unit 217.

When the switching unit 218 is ON, the regulator 208 can supply power from the rectifying and smoothing circuit 203 to the communication unit 212, the imaging unit 213, and the recording unit 217 via the switching unit 218. When the switching unit 218 is OFF, the regulator 208 cannot supply power from the rectifying and smoothing circuit 203 to the communication unit 212, the imaging unit 213, and the recording unit 217 via the switching unit 218.

Further, when the switching unit 218 is ON, the regulator 208 can supply power from the battery 210 to the communication unit 212, the imaging unit 213 and the recording unit 217 via the switching unit 218. When the switching unit 218 is OFF, the regulator 208 cannot supply power from the battery 210 to the communication unit 212, the imaging unit 213, and the recording unit 217 via the switching unit 218.

The switching unit 218 can be a relay switch or can be any available switch provided beforehand in the electronic apparatus 200.

The switching unit 218 is not limited to the switch that connects the regulator 208 to the communication unit 212, the imaging unit 213, and the recording unit 217. For example, the switching unit 218 can be configured as a switch that can connect the regulator 208 to any one of the communication unit 212, the imaging unit 213, and the recording unit 217. Further, the switching unit 218 can include a switch that can connect the regulator 208 to the communication unit 212, a switch that can connect the regulator 208 to the imaging unit 213, and a switch that can connect the regulator 208 to the recording unit 217.

Further, the switching unit 215 and the switching unit 218 can be integrated as a single switch.

Each of the power supply antenna 108 and the power receiving antenna 201 can be a helical antenna, a loop antenna, or a planar antenna (e.g., a meander line antenna).

Further, the process performed by the power supply apparatus 100 in the first exemplary embodiment can be supplied to a system in which the power supply apparatus 100 supplies power wirelessly to the electronic apparatus 200 by electromagnetic coupling. Similarly, the process performed by the electronic apparatus 200 in the first exemplary embodiment can be supplied to a system in which the power supply apparatus 100 supplies power wirelessly to the electronic apparatus 200 by electromagnetic coupling.

Further, the present invention can be supplied to a system in which an electrode serving as the power supply antenna 108 is provided on the power supply apparatus 100 while an electrode serving as the power receiving antenna 201 is provided on the electronic apparatus 200, and the power supply apparatus 100 supplies power to the electronic apparatus 200 by electric field coupling.

Further, the present invention can be supplied to a system in which the power supply apparatus 100 supplies power wirelessly to the electronic apparatus 200 by electromagnetic induction.

In the first exemplary embodiment, the power supply apparatus 100 transmits power wirelessly to the electronic apparatus 200 and the electronic apparatus 200 receives power wirelessly from the power supply apparatus 100. However, the term "wirelessly" can be translated as "contactless" or "noncontact."

Example detection process that can be performed by the power supply apparatus 100 is described in detail below with reference to a flowchart illustrated in FIG. 5. The power supply apparatus 100 performs the detection process illustrated in FIG. 5 if the power source of the power supply apparatus 100 is ON and the operation mode of the power supply apparatus 100 is one of the first power supply mode and the second power supply mode. To realize the process of the flowchart illustrated in FIG. 5, the CPU 105 executes the computer program stored in the ROM 106.

In step S501, the CPU 105 controls the oscillator 101, the power transmission circuit 102, and the matching circuit 103 so as to supply the first power to detect whether the distance between the power supply apparatus 100 and the electronic apparatus 200 is in a predetermined range. In this case, the process proceeds from step S501 to step S502. The CPU 105 can transmit information indicating a value of the first power to the electronic apparatus 200 via the power supply antenna 108, when the first power is supplied to the electronic apparatus 200.

In step S502, the CPU 105 calculates the VSWR based on the information indicating the amplitude voltage V1 of the traveling wave and the information indicating the amplitude voltage V2 of the reflected wave detected by the reflected power detection circuit 114. Further, the CPU 105 stores the calculated VSWR in the RAM 107. In this case, the process proceeds from step S502 to step S503. The VSWR calculated by the CPU 105 in step S502 is hereinafter referred to as "VSWR1."

In step S503, the CPU 105 controls the modulation and demodulation circuit 104 so as to transmit a first command (i.e., a command requesting the identification information of the electronic apparatus 200) to the electronic apparatus 200. The CPU 105 transmits the first command to the electronic apparatus 200 to determine whether the distance between the power supply apparatus 100 and the electronic apparatus 200 is in the predetermined range. In this case, the process proceeds from step S503 to step S504.

In step S504, the CPU 105 determines whether the modulation and demodulation circuit 104 has received the identification information of the electronic apparatus 200 as a response corresponding to the first command transmitted to the electronic apparatus 200 in step S503.

If the CPU 105 determines that the modulation and demodulation circuit 104 has received the identification information of the electronic apparatus 200 (YES in step S504), the CPU 105 acquires the identification information of the electronic apparatus 200 from the modulation and demodulation circuit 104 and stores the acquired identification information in the RAM 107. In this case (YES in step S504), the CPU 105 determines that the distance between the power supply apparatus 100 and the electronic apparatus 200 is in the predetermined range.

In this case (YES in step S504), the process proceeds from step S504 to step S505.

If the CPU 105 determines that the modulation and demodulation circuit 104 has not yet received the identification information of the electronic apparatus 200 (NO in step S504), the process proceeds from step S504 to step S510. In this case (NO in step S504), the CPU 105 determines that the distance between the power supply apparatus 100 and the electronic apparatus 200 is not in the predetermined range.

In step S505, the CPU 105 determines whether the electronic apparatus 200 is the predetermined apparatus based on the identification information of the electronic apparatus 200 acquired in step S504.

The CPU 105 determines whether the electronic apparatus 200 is the predetermined apparatus based on the identification information of the electronic apparatus 200 acquired in step S504 and the management table stored in the ROM 106.

If the management table stored in the ROM 106 includes any information that corresponds to the identification information of the electronic apparatus 200 acquired in step S505, the CPU 105 determines that the electronic apparatus 200 is the predetermined apparatus.

If the management table stored in the ROM 106 does not include any information that corresponds to the identification information of the electronic apparatus 200 acquired in step S505, the CPU 105 determines that the electronic apparatus 200 is not the predetermined apparatus.

If the CPU 105 determines that the electronic apparatus 200 is the predetermined apparatus (YES in step S505), the process proceeds from step S505 to step S506. In this case (YES in step S505), the CPU 105 determines that the electronic apparatus 200 existing in the predetermined range as determined in step S504 is not a foreign object.

If the CPU 105 determines that the electronic apparatus 200 is not the predetermined apparatus (NO in step S505), the process proceeds from step S505 to step S510. In this case (NO in step S505), the CPU 105 determines that the electronic apparatus 200 existing in the predetermined range as determined in step S504 is a foreign object.

The foreign object is, for example, an integrated circuit (IC) card or a metal device.

If the power supply apparatus 100 is supplying power to an IC card, the IC card may be failed based on the power supplied from the power supply apparatus 100. Therefore, the power supply apparatus 100 is required to detect the IC card as a foreign object and stop supplying power to the IC card. The IC card may include a unit capable of transmitting a response corresponding to a command transmitted from the power supply apparatus 100. Therefore, in step S505, the CPU 105 detects the IC card as a foreign object that includes a unit capable of transmitting a response replying to a command transmitted from the power supply apparatus 100 based on the identification information acquired in step S504 and the management table.

The process in step S505 (i.e., the process to be performed to detect a foreign object by determining whether the electronic apparatus 200 is the predetermined apparatus) is hereinafter referred to as "third detection process."

In step S506, the CPU 105 performs device information acquisition process as described in detail below. In the device information acquisition process, the CPU 105 acquires the power receiving information of the electronic apparatus 200, the device information of the electronic apparatus 200, the second current information, the second voltage information, and the threshold value relating to the power supply efficiency from the electronic apparatus 200.

The CPU 105 stores the device information acquired from the electronic apparatus 200 in the RAM 107.

When the CPU 105 completes the device information acquisition process, the process proceeds from step S506 to step S507.

In step S507, the CPU 105 calculates a power supply efficiency of the power supply apparatus 100 based on the information acquired in the device information acquisition process performed in step S506.

The power supply efficiency of the power supply apparatus 100 can be calculated by dividing a value indicating the power received by the electronic apparatus 200 by a value indicating the power supplied from the power supply apparatus 100.

The CPU 105 calculates the power supplied from the power supply apparatus 100 as a product of the first current information stored and the first voltage information in the RAM 107. Further, the CPU 105 calculates the power received by the electronic apparatus 200 as a product of the second current information and the second voltage information acquired in step S506.

The CPU 105 stores a value indicating the power supply efficiency of the power supply apparatus 100 in the RAM 107. In this case, the process proceeds from step S507 to step S508.

The amplitude voltage V2 of the reflected wave detectable by the reflected power detection circuit 114 when an electronic apparatus as a power supply target of the power supply apparatus 100 is in the predetermined range is greater than that detectable when the target electronic apparatus is not in the predetermined range. Therefore, if an electronic apparatus is a power supply target in the predetermined range, the VSWR detectable by the CPU 105 changes so as to increase compared to that in a case where the power supply target electronic apparatus is not in the predetermined range.

Similarly, the amplitude voltage V2 of the reflected wave detectable by the reflected power detection circuit 114 when two electronic apparatuses are as power supply targets in the predetermined range is greater than that detectable when a single target electronic apparatus to which power is supplied from the power supply apparatus 100 is in the predetermined range. Therefore, in this case, the VSWR detectable by the CPU 105 changes so as to increase.

If the distance between the power supply apparatus 100 and a foreign object is in the predetermined range, the VSWR detectable by the CPU 105 may change rapidly due to influence of the foreign object compared to a case where the power supply target electronic apparatus is in the predetermined range.

Thus, the CPU 105 detects whether a foreign object is in the predetermined range based on a change amount of the VSWR.

Hence, in step S508, the CPU 105 calculates the VSWR based on the amplitude voltage V1 of the traveling wave and the amplitude voltage V2 of the reflected wave acquired from the reflected power detection circuit 114. Then, the CPU 105 compares the calculated VSWR with the VSWR1. The VSWR calculated by the CPU 105 in step S508 is hereinafter referred to as "VSWR2."

Further, the CPU 105 calculates the change amount of the VSWR based on a comparison between VSWR1 and the VSWR2. Further, the CPU 105 determines whether the change amount of the VSWR is equal to or greater than a predetermined value A.

The predetermined value A is stored beforehand in the ROM 106. Further, the predetermined value A is a value greater than a change amount of the VSWR in a case where an electronic apparatus is newly placed as a power supply target in the predetermined range so that a foreign object can be discriminated from the target electronic apparatus. The predetermined value A is not limited to a fixed value and can be a variable value that the CPU 105 can change.

If the CPU 105 determines that the change amount of the VSWR is equal to or greater than the predetermined value A (YES in step S508), the CPU 105 determines that a foreign object and the electronic apparatus 200 are in the predetermined range. In this case (YES in step S508), the process proceeds from step S508 to step S509.

If the CPU 105 determines that the change amount of the VSWR is less than the predetermined value A (NO in step S508), the process proceeds from step S508 to step S512.

The process in step S508 to be performed to detect a foreign object based on a comparison between the change amount of the VSWR and the predetermined value A is hereinafter referred to as "first detection process."

In step S509, the CPU 105 controls the display unit 113 to display warning data for notifying a user of the presence of a foreign object in the vicinity of the power supply apparatus 100. Further, the CPU 105 can control the display unit 113 to display additional data for recommending a user to remove the detected foreign object from the power supply apparatus 100.

If the warning data has been displayed on the display unit 113, the process proceeds from step S509 to step S510.

In step S510, the CPU 105 controls one of the oscillator 101, the power transmission circuit 102, and the matching circuit 103 to stop supplying power to the electronic apparatus 200. If the power transmission circuit 102 is generating the first power, the CPU 105 controls one of the oscillator 101, the power transmission circuit 102, and the matching circuit 103 to stop supplying the first power.

Further, if the power transmission circuit 102 is generating the second power, the CPU 105 controls one of the oscillator 101, the power transmission circuit 102, and the matching circuit 103 to stop supplying the second power. Further, if the power transmission circuit 102 is generating the third power, the CPU 105 controls one of the oscillator 101, the power transmission circuit 102 and the matching circuit 103 to stop supplying the third power. In this case, the process proceeds from step S510 to step S511.

Further, in step S510, the CPU 105 can stop supplying power to the electronic apparatus 200 by controlling the values of the variable capacitor 302 and the variable coil 303 included in the matching circuit 103 so that a resonance between the power supply apparatus 100 and the electronic apparatus 200 is disconnected. Further, in step S510, the CPU 105 can stop supplying power to the electronic apparatus 200 by causing the oscillator 101 to stop oscillating. Further, in step S510, the CPU 105 can stop supplying power to the electronic apparatus 200 by causing the power transmission circuit 102 to stop generating power.

In step S511, the CPU 105 controls the power supply apparatus 100 so as to change the operation mode from the power supply mode to a standby mode.

The standby mode is a mode for partly stopping the operation of the power supply apparatus 100 while causing the power supply apparatus 100 to perform the rest of the operation. When the power supply apparatus 100 is in the standby mode, the CPU 105, the ROM 106, the RAM 107, and the timer 109 can perform their operations while the remaining units stop their operations.

When the communication unit 112 is receiving video data from the electronic apparatus 200, the CPU 105 does not cause the communication unit 112 to stop receiving the video data even when the operation mode of the power supply apparatus 100 is changed to the standby mode. Similarly, when the communication unit 112 is transmitting video data to the electronic apparatus 200, the CPU 105 does not cause the communication unit 112 to stop transmitting the video data even when the operation mode of the power supply apparatus 100 is changed to the standby mode.

Further, when the display unit 113 is displaying video data, the CPU 105 does not cause the display unit 113 to stop displaying the video data even when the operation mode of the power supply apparatus 100 is changed to the standby mode. Further, when the recording unit 110 is recording at least one of video data and audio data on the recording medium 110*a*, the CPU 105 does not cause the recording unit 110 to stop recording the data even when the operation mode of the power supply apparatus 100 is changed to the standby mode.

Figure 5:
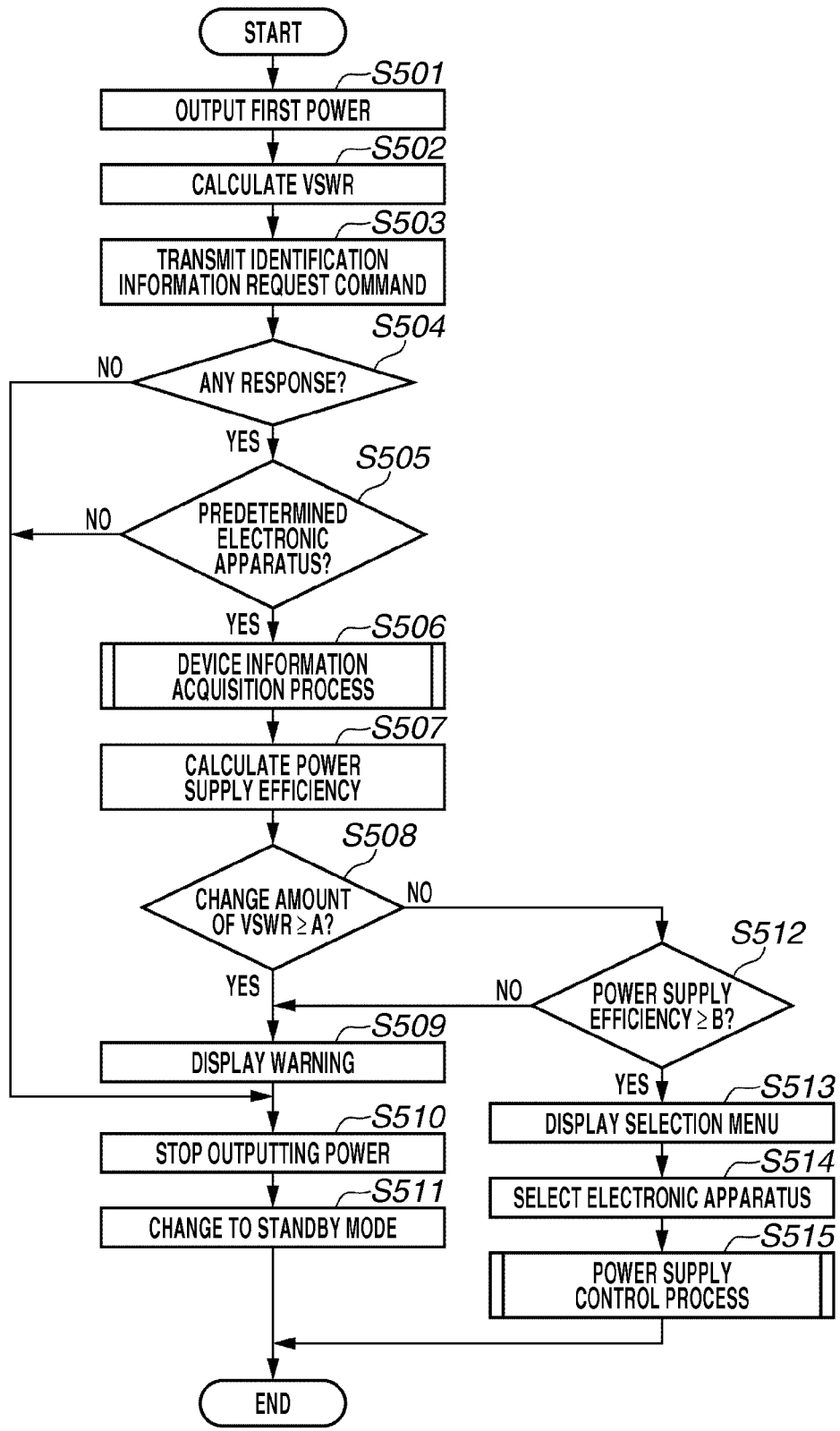
FIG. 5 is a flowchart illustrating an example of detection process that is performed by the power supply apparatus according to the first and second exemplary embodiments.

When the operation mode of the power supply apparatus 100 is changed to the standby mode, the CPU 105 terminates the process of the flowchart illustrated in FIG. 5. When the power supply apparatus 100 is in the standby mode, the CPU 105 controls the timer 109 so as to measure the time elapsed since the operation mode of the power supply apparatus 100 is changed to the standby mode. If the time measured by the timer 109 has reached a predetermined time, the CPU 105 causes the power supply apparatus 100 to change the operation mode from the standby mode to the power supply mode to perform the process in step S501 again. In this case, the CPU 105 can delete the information acquired from the electronic apparatus 200 from the RAM 107 before starting the process of step S501.

If both a foreign object and the electronic apparatus 200 are in the predetermined range, the power is supplied from the power supply apparatus 100 to both the electronic apparatus 200 and the foreign object. Thus, the power that the electronic apparatus 200 can receive from the power supply apparatus 100 in a case where the power is supplied from the power supply apparatus 100 to both the electronic apparatus 200 and the foreign object may be less than the power that the electronic apparatus 200 can receive from the power supply apparatus 100 in a case where the power is supplied from the power supply apparatus 100 to only the electronic apparatus 200.

Therefore, the power supply efficiency of the power supply apparatus 100 in the case where the power is supplied from the power supply apparatus 100 to both the electronic apparatus 200 and the foreign object is less than the power supply efficiency of the power supply apparatus 100 in the case where the power is supplied from the power supply apparatus 100 to only the electronic apparatus 200.

Thus, the CPU 105 can determine whether a foreign object is in the predetermined range by based on the power supply efficiency of the power supply apparatus 100.

Hence, in step S512, the CPU 105 determines whether the power supply efficiency calculated in step S507 is equal to or greater than a predetermined value B.

The predetermined value B is a threshold value relating to the power supply efficiency acquired from the electronic apparatus 200 in the device information acquisition process in step S506.

If the CPU 105 determines that the power supply efficiency of the power supply apparatus 100 is equal to or greater than the predetermined value B (YES in step S512), the process proceeds from step S512 to step S513. In this case (YES in step S512), the CPU 105 determines that the electronic apparatus 200 is in the predetermined range and there is not any foreign object in the predetermined range.

If the CPU 105 determines that the power supply efficiency of the power supply apparatus 100 is less than the predetermined value B (NO in step S512), the process proceeds from step S512 to step S509. In this case (NO in step S512), the CPU 105 determines that the electronic apparatus 200 and a foreign object are in the predetermined range.

The process in step S512 to be performed to detect a foreign object based on a comparison between the power supply efficiency of the power supply apparatus 100 and the predetermined value B is hereinafter referred to as "second detection process."

In step S513, the CPU 105 controls the display unit 113 so as to display a selection menu to enable a user to select a target apparatus to which the power supply apparatus 100 supplies power. In this case, the process proceeds from step S513 to step S514. The selection menu is video data that enables a user to select a power supply target to which power is preferentially supplied.

The selection menu includes information required to identify the electronic apparatus 200. If the power supply apparatus 100 has already completed the process from step S501 to step S512 for an apparatus other than the electronic apparatus 200, the selection menu displayed by the display unit 113 includes information required to identify the apparatus other than the electronic apparatus 200 in addition to the information required to identify the electronic apparatus 200.

The information required to identify the electronic apparatus 200 is, for example, the identification information of the electronic apparatus 200, an icon corresponding to the electronic apparatus 200, the apparatus name of the electronic apparatus 200, product name of the electronic apparatus 200, or the manufacturer name of the electronic apparatus 200. Further, the information required to identify the electronic apparatus 200 can be information indicating a remaining capacity of the battery 210 attached to the electronic apparatus 200.

Information required to identify an apparatus other than the electronic apparatus 200 can be similar to the information required to identify the electronic apparatus 200.

In step S514, the CPU 105 selects a power supply target to which power is preferentially supplied according to a user instruction input from the operation unit 115. The CPU 105 stores, in the RAM 107, information indicating performing power supply control process for the electronic apparatus selected according to the user instruction input via the operation unit 115. The CPU 105 controls the matching circuit 103 so as to cause the power supply antenna 108 to resonate with a power receiving antenna of the electronic apparatus selected as the power supply target to which power is preferentially supplied.

If an apparatus selected as the power supply target to which power is preferentially supplied is the electronic apparatus 200, the CPU 105 controls the matching circuit 103 so as to cause the power supply antenna 108 to resonate with the power receiving antenna 201. In this case, the process proceeds from step S514 to step S515.

If there is not any user instruction input via the operation unit 115 during the predetermined time in step S514, the CPU 105 preferentially selects an apparatus whose battery is lowest in remaining capacity as a power supply target. Further, when no user instruction is input via the operation unit 115 during the predetermined time, the CPU 105 can preferentially select an apparatus whose identification information is earliest in acquisition order as a power supply target. Further, when no user instruction is input via the operation unit 115 during the predetermined time, the CPU 105 can preferentially select an apparatus whose manufacturer name is identical to that of the power supply apparatus 100 as a power supply target.

In step S515, the CPU 105 performs power supply control process as described in detail below. When the CPU 105 completes the power supply control process, the CPU 105 terminates the process illustrated in FIG. 5.

In step S510, the CPU 105 can control the modulation and demodulation circuit 104 so as to transmit a power supply stop command to the electronic apparatus 200 before the CPU 105 stops supplying power to the electronic apparatus 200.

In step S512, instead of comparing the power supply efficiency with the predetermined value B, it is useful to provide a predetermined maximum value and a predetermined minimum value so that the CPU 105 can determine whether the power supply efficiency exists in a range between the predetermined maximum value and the predetermined minimum value. In this case, if the power supply efficiency is a value in the range between the predetermined maximum value and the predetermined minimum value, the process proceeds from step S512 to step S513. Further, if the power supply efficiency is not present between the predetermined maximum value and the predetermined minimum value, the process proceeds from step S512 to step S509.

The identification information of the electronic apparatus 200 is not limited to ID and can be any other information that can identify the electronic apparatus 200 (e.g., the product name of the electronic apparatus 200 or the apparatus name of the electronic apparatus 200).

The first power supplied to, the electronic apparatus 200 in step S501 is continuously supplied from the power supply apparatus 100 to the electronic apparatus 200 via the power supply antenna 108 until the CPU 105 stops supplying the electronic apparatus 200 in step S510.

The process to be performed in step S512 is not limited to the above-described process for determining whether a foreign object is present in the predetermined range. For example, the CPU 105 can exchange the process of step S508 and the process of step S512. If step S508 and step S512 are replaced in process order, the CPU 105 performs process in step S508 after it is determined that the power supply efficiency of the power supply apparatus 100 is equal to or greater than the predetermined value B.

In this case, if it is determined that the power supply efficiency of the power supply apparatus 100 is equal to or greater than the predetermined value B and the change amount of the VSWR is less than the predetermined value A, the CPU 105 performs the above-described process in step S513 to step S515. If it is determined that the power supply efficiency of the power supply apparatus 100 is equal to or greater than the predetermined value B and the change amount of the voltage standing wave ratio VSWR is equal to or greater than the predetermined value A, the CPU 105 performs the above-described process in step S509 to step S511.

Further, in this case, if it is determined that the power supply efficiency of the power supply apparatus 100 is less than the predetermined value B, the CPU 105 performs the above-described process in step S509 to step S511.

The process to be performed in step S509 is not limited to the control performed by the CPU 105 to display the warning data on the display unit 113. For example, in a case where the power supply apparatus 100 is connected to an external display apparatus via a digital interface, the CPU 105 can control the external display apparatus to display the warning data.

Further, the predetermined value B used in step S512 for the comparison with the power supply efficiency calculated in step S507 is not limited to the value acquired from the electronic apparatus 200 by the CPU 105. For example, the predetermined value B can be acquired based on any other information that the CPU 105 has acquired from the electronic apparatus 200.

Further, the process to be performed in step S513 is not limited to the control performed by the CPU 105 to display the selection menu on the display unit 113. For example, in a case where the power supply apparatus 100 is connected to an external display apparatus via a digital interface, the CPU 105 can control the external display apparatus to display the selection menu.

Next, an example of the device information acquisition process that can be performed by the power supply apparatus 100 is described in detail below with reference to a flowchart illustrated in FIG. 6. The CPU 105 performs the device information acquisition process illustrated in FIG. 6 in step S506 illustrated in FIG. 5. To realize the process of the flowchart illustrated in FIG. 6, the CPU 105 executes the computer program loaded from the ROM 106.

In step S601, the CPU 105 controls the modulation and demodulation circuit 104 so as to transmit a second command to the electronic apparatus 200 (i.e., the predetermined apparatus identified in step S505). The second command is a command usable to request the device information of the electronic apparatus 200. In this case, the process proceeds from step S601 to step S602.

In step S602, the CPU 105 determines whether the modulation and demodulation circuit 104 has received the device information of the electronic apparatus 200 as a response corresponding to the second command transmitted to the electronic apparatus 200 in step S601.

If the CPU 105 determines that the modulation and demodulation circuit 104 has received the device information of the electronic apparatus 200 (YES in step S602), the CPU 105 acquires the device information of the electronic apparatus 200 from the modulation and demodulation circuit 104 and stores the acquired device information in the RAM 107. In this case (YES in step S602), the process proceeds from step S602 to step S603.

Figure 6:
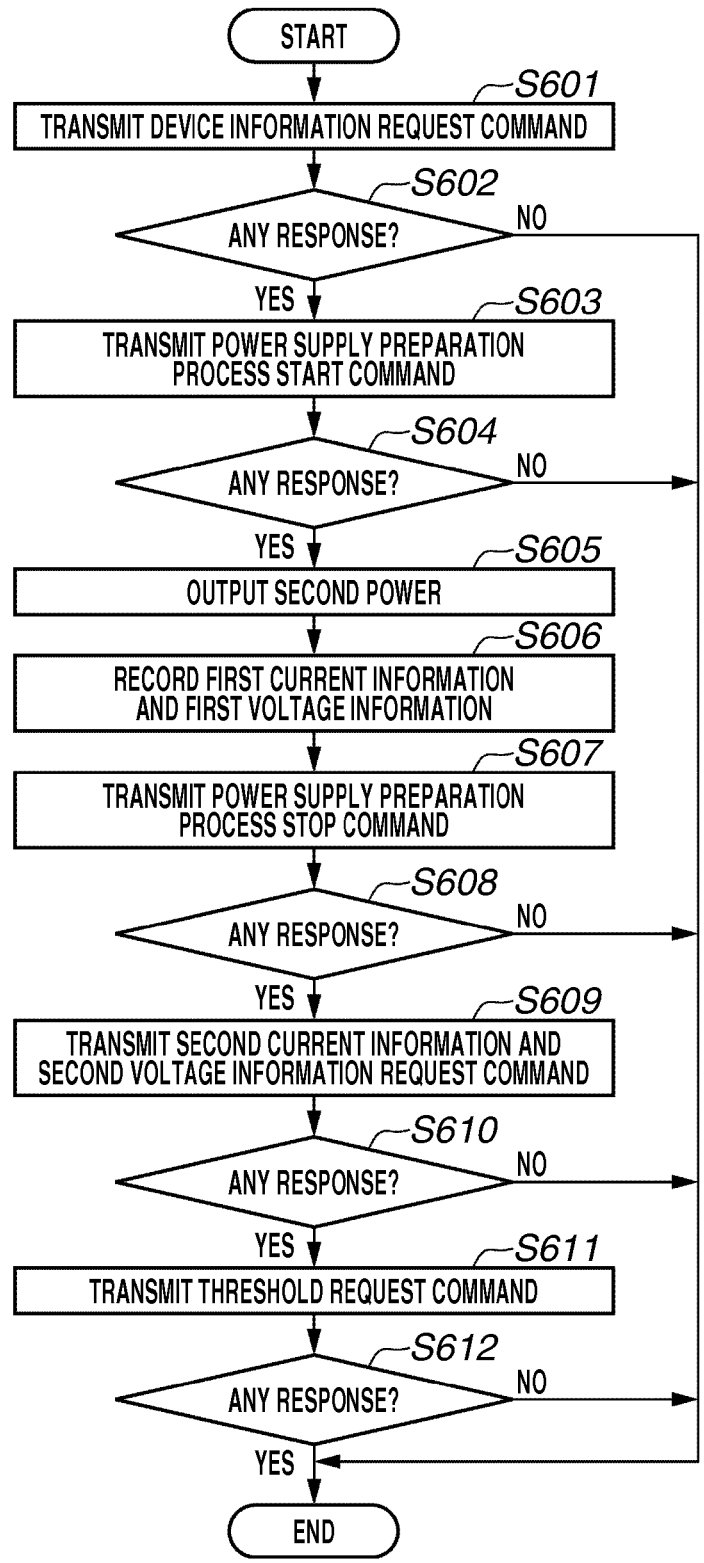
FIG. 6 is a flowchart illustrating device information acquisition process that is performed by the power supply apparatus according to the first and second exemplary embodiments.

If the CPU 105 determines that the modulation and demodulation circuit 104 has not received the device information of the electronic apparatus 200 (NO in step S602), the CPU 105 terminates the process of the flowchart illustrated in FIG. 6 and proceeds to step S510 of the detection process illustrated in FIG. 5 to perform the above-described process of step S510 and step S511.

In step S603, the CPU 105 controls the modulation and demodulation circuit 104 so as to transmit a third command to the electronic apparatus 200. The third command is a command usable to notify the electronic apparatus 200 of starting the process for acquiring the second current information and the second voltage information from the electronic apparatus 200.

The process for acquiring the second current information and the second voltage information from the electronic apparatus 200 is hereinafter referred to as "power supply preparation process." The CPU 105 performs the power supply preparation process to acquire the second current information and the second voltage information (i.e., the information to be used in calculation of the power supply efficiency) from the electronic apparatus 200.

In this case, the process proceeds from step S603 to step S604.

In step S604, the CPU 105 determines whether the modulation and demodulation circuit 104 has received a response corresponding to the third command transmitted to the electronic apparatus 200 in step S603.

If the CPU 105 determines that the modulation and demodulation circuit 104 has received a response corresponding to the third command (YES in step S604), the CPU 105 determines that the operation mode of the electronic apparatus 200 has been changed to a mode suitable for the power supply preparation process. In this case (YES in step S604), the process proceeds from step S604 to step S605.

If the CPU 105 determines that the modulation and demodulation circuit 104 has not received the response corresponding to the third command (NO in step S604), the CPU 105 determines that the operation mode of the electronic apparatus 200 has not been changed to the mode suitable for the power supply preparation process. In this case (NO in step S604), the CPU 105 determines that the second current information and the second voltage information cannot be acquired from the electronic apparatus 200. In this case (NO step S604), the CPU 105 terminates the process of the flowchart illustrated in FIG. 6 and proceeds to step S510 of the detection process illustrated in FIG. 5 to perform the above-described process of step S510 and step S511.

In step S605, the CPU 105 controls the power transmission circuit 102 and the matching circuit 103 so as to supply the second power to the electronic apparatus 200 via the power supply antenna 108.

When the second power is supplied to the electronic apparatus 200, the CPU 105 can transmit information indicating a value of the second power to the electronic apparatus 200 via the power supply antenna 108. In this case, the process proceeds from step S605 to step S606.

In step S606, the CPU 105 stores, in the RAM 107, the first current information and the first voltage information acquired by the reflected power detection circuit 114. In this case, the process proceeds from step S606 to step S607.

In step S607, the CPU 105 controls the modulation and demodulation circuit 104 so as to transmit a fourth command to the electronic apparatus 200. The fourth command is a command usable to notify the electronic apparatus 200 of stopping the power supply preparation process.

Before transmitting the fourth command to the electronic apparatus 200, the CPU 105 controls the power transmission circuit 102 and the matching circuit 103 in so as to supply the first power to the electronic apparatus 200 after stopping supplying the second power to the electronic apparatus 200.

In this case, the process proceeds from step S607 to step S608.

In step S608, the CPU 105 determines whether the modulation and demodulation circuit 104 has received a response corresponding to the fourth command transmitted to the electronic apparatus 200 in step S603.

If the CPU 105 determines that the modulation and demodulation circuit 104 has received the response corresponding to the fourth command (YES in step S608), the CPU 105 determines that the electronic apparatus 200 has been released from the mode suitable for the power supply preparation process. In this case (YES in step S608), the process proceeds from step S608 to step S609.

If the CPU 105 determines that the modulation and demodulation circuit 104 has not received the response corresponding to the fourth command (NO in step S608), the CPU 105 determines that the electronic apparatus 200 has not been released from the mode suitable for the power supply preparation process. In this case (NO in step S608), the CPU 105 terminates the process of the flowchart illustrated in FIG. 6 and proceeds to step S510 of the detection process illustrated in FIG. 5 to perform the above-described process of step S510 and step S511.

In step S609, the CPU 105 controls the modulation and demodulation circuit 104 so as to transmit a fifth command to the electronic apparatus 200. The fifth command is a command usable to request the second current information and the second voltage information detected by the electronic apparatus 200. In this case, the process proceeds from step S609 to step S610.

In step S610, the CPU 105 determines whether the modulation and demodulation circuit 104 has received the second current information of the electronic apparatus 200 and the second voltage information of the electronic apparatus 200, as a response corresponding to the fifth command transmitted to the electronic apparatus 200 in step S609.

If the CPU 105 determines that the modulation and demodulation circuit 104 has received the second current information of the electronic apparatus 200 and the second voltage information of the electronic apparatus 200 (YES in step S610), the CPU 105 stores the acquired information (i.e., the second current information and the second voltage information) in the RAM 107.

In this case (YES in step S610), the process proceeds from step S610 to step S611.

If the CPU 105 determines that the modulation and demodulation circuit 104 has not received the second current information of the electronic apparatus 200 and the second voltage information of the electronic apparatus 200 (NO in step S610), the CPU 105 determines that the power supply efficiency cannot be calculated. In this case (NO in step S610), the CPU 105 terminates the process of the flowchart illustrated in FIG. 6 and proceeds to step S510 of the detection process illustrated in FIG. 5 to perform the above-described process of step S510 and step S511.

In this case (NO in step S610), the CPU 105 cannot calculate the power supply efficiency to be used in the process of step S512. Therefore, the CPU 105 cannot detect a foreign object based on the power supply efficiency although the CPU 105 can detect a foreign object based on the change amount of the VSWR.

In step S611, the CPU 105 controls the modulation and demodulation circuit 104 so as to transmit a sixth command to the electronic apparatus 200. The sixth command is a command usable to request a threshold value. In this case, the process proceeds from step S611 to step S612. The threshold value requested to the electronic apparatus 200 by the sixth command is a threshold value relating to the power supply efficiency. If the electronic apparatus 200 receives the sixth command, thd electronic apparatus 200 transmits the predetermined value B as a response corresponding to the sixth command.

In step S612, the CPU 105 determines whether the modulation and demodulation circuit 104 has received the predetermined value B as the response corresponding to the sixth command transmitted to the electronic apparatus 200 in step S611.

If the CPU 105 determines that the modulation and demodulation circuit 104 has received the predetermined value B (YES in step S612), the CPU 105 receives the predetermined value B from the modulation and demodulation circuit 104 and stores the received predetermined value B in the RAM 107. In this case (YES in step S612), the CPU 105 terminates the process of the flowchart illustrated in FIG. 6 and proceeds to step S507 of the detection process illustrated in FIG. 5.

If the CPU 105 determines that the modulation and demodulation circuit 104 has not received the predetermined value B (NO in step S612), the CPU 105 determines that the predetermined value B cannot be acquired. In this case (NO in step S612), the CPU 105 terminates the process of the flowchart illustrated in FIG. 6 and proceeds to step S510 of the detection process illustrated in FIG. 5 to perform the above-described process of step S510 and step S511.

In this case (NO in step S612), the CPU 105 cannot acquire the predetermined value B to be used in the process of step S512. Therefore, the CPU 105 cannot detect a foreign object based on the power supply efficiency although the CPU 105 can detect a foreign object based on the VSWR.

The second power supplied to the electronic apparatus 200 in step S605 is continuously supplied from the power supply apparatus 100 to the electronic apparatus 200 via the power supply antenna 108 until the CPU 105 stops supplying the second power to the electronic apparatus 200 in step S607.

Figure 7:
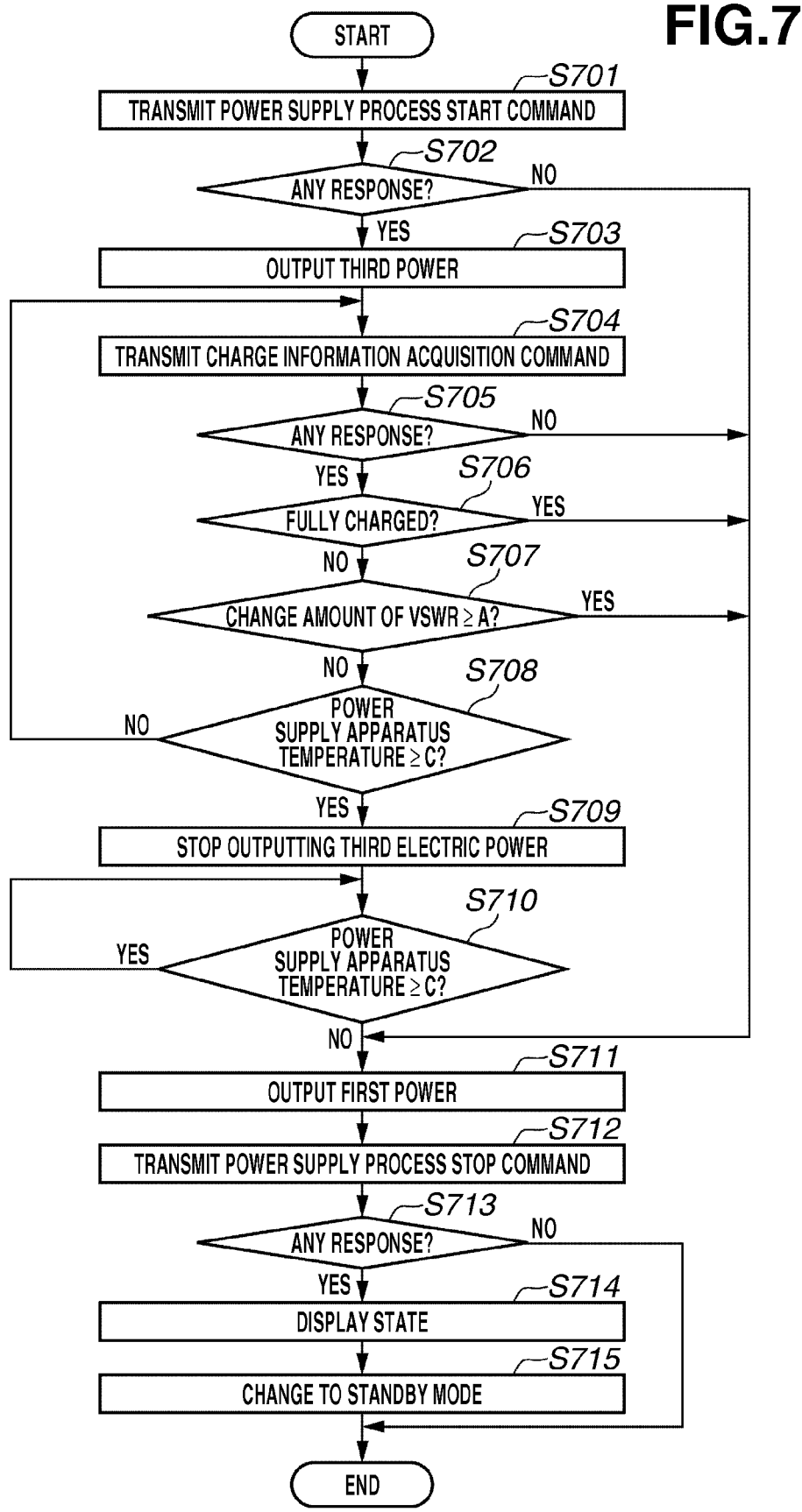
FIG. 7 is a flowchart illustrating power supply control process that is performed by the power supply apparatus according to the first exemplary embodiment.

Next, the power supply control process that can be performed by the power supply apparatus 100 according to the first exemplary embodiment is described in detail below with reference to a flowchart illustrated in FIG. 7. The power supply control process illustrated in FIG. 7 is performed by CPU 105 in step S515 of FIG. 5. To realize the process of the flowchart illustrated in FIG. 7, the CPU 105 executes the computer program loaded from the ROM 106.

The power supply control process illustrated in FIG. 7 is performed in step S515 for an electronic apparatus selected by the CPU 105 as a power supply target.

If the electronic apparatus 200 is selected as a power supply target in step S515, the CPU 105 performs the power supply control process in the following manner.

In step S701, the CPU 105 controls the matching circuit 103 and the modulation and demodulation circuit 104 so as to transmit a seventh command to the electronic apparatus 200. The seventh command is usable to notify the electronic apparatus 200 of starting process for supplying the third power. The process for transmitting the third power to the electronic apparatus 200 is hereinafter referred to as "power supply process." In this case, the process proceeds from step S701 to step S702.

In step S702, the CPU 105 determines whether the modulation and demodulation circuit 104 has received a response corresponding to the seventh command transmitted to the electronic apparatus 200 in step S701.

If the CPU 105 determines that the modulation and demodulation circuit 104 has received the response corresponding to the seventh command (YES in step S702), the CPU 105 determines that the operation mode of the electronic apparatus 200 has been changed to a mode for receiving the third power to be supplied from the power supply apparatus 100. In this case (YES in step S702), the process proceeds from step S702 to step S703.

If the CPU 105 determines that the modulation and demodulation circuit 104 has not received the response corresponding to the seventh command (NO in step S702), the CPU 105 determines that the operation mode of the electronic apparatus 200 has not been changed to the mode for receiving the third power to be supplied from the power supply apparatus 100. In this case (NO in step S702), the process proceeds from step S702 to step S711.

In step S703, the CPU 105 controls the oscillator 101, the power transmission circuit 102, and the matching circuit 103 so as to supply the third power to the electronic apparatus 200 via the power supply antenna 108.

When the third power is supplied to the electronic apparatus 200, the CPU 105 can transmit information indicating a value of the third power to the electronic apparatus 200 via the power supply antenna 108.

The CPU 105 sets the value of the third power based on the power receiving information of the electronic apparatus 200 acquired from the electronic apparatus 200. The CPU 105 sets the value of the third power to be equal to or greater than the minimum power that the electronic apparatus 200 can receive from the power supply apparatus 100 and is equal to or less than the maximum power that the electronic apparatus 200 can receive from the power supply apparatus 100.

Further, the CPU 105 can set the value of the third power based on the power supply efficiency calculated in step S507.

Further, the CPU 105 can set the value of the third power based on the information indicating power required for the communication unit 212 of the electronic apparatus 200 to operate, which is included in the power receiving information of the electronic apparatus 200. Further, the CPU 105 can set the value of the third power based on the information indicating power required for the electronic apparatus 200 to perform charging, which is included in the power receiving information of the electronic apparatus 200.

Further, the CPU 105 can set the value of the third power based on the information indicating power required for the imaging unit 213 of the electronic apparatus 200 to operate, which is included in the power receiving information of the electronic apparatus 200. Further, the CPU 105 can set the value of the third power based on the information indicating power required for the recording unit 217 of the electronic apparatus 200 to operate, which is included in the power receiving information of the electronic apparatus 200.

In this case, the process proceeds from step S703 to step S704.

In step S704, the CPU 105 controls the modulation and demodulation circuit 104 so as to transmit an eighth command to the electronic apparatus 200. The eighth command is usable to acquire charge information of the electronic apparatus 200. In this case, the process proceeds from step S704 to step S705.

In step S705, the CPU 105 determines whether the modulation and demodulation circuit 104 has received the charge information of the electronic apparatus 200 as a response corresponding to the eighth command transmitted to the electronic apparatus 200 in step S704.

If the CPU 105 determines that the modulation and demodulation circuit 104 has received the charge information of the electronic apparatus 200 (YES in step S705), the CPU 105 records the charge information of the electronic apparatus 200 in the RAM 107. In this case (YES in step S705), the process proceeds from step S705 to step S706.

If the CPU 105 determines that the modulation and demodulation circuit 104 has not received the charge information of the electronic apparatus 200 (NO in step S705), the process proceeds from step S705 to step S711.

In step S706, the CPU 105 determines whether the battery 210 of the electronic apparatus 200 is in a full-charge state based on the charge information of the electronic apparatus 200 acquired in step S705.

If the CPU 105 determines that the battery 210 of the electronic apparatus 200 is in the full-charge state (YES in step S706), the process proceeds from step S706 to step S711.

If the CPU 105 determines that the battery 210 of the electronic apparatus 200 is not in the full-charge state (NO in step S706), the process proceeds from step S706 to step S707.

In step S707, the CPU 105 calculates the VSWR based on the amplitude voltage V1 of the traveling wave and the amplitude voltage V2 of the reflected wave acquired from the reflected power detection circuit 114, similar to step S508. The CPU 105 compares the calculated VSWR with the ratio VSWR2. The VSWR calculated in step S707 is hereinafter referred to as "VSWR3."

In step S707, the CPU 105 calculates a change amount of VSWR based on a comparison between the VSWR2 and the VSWR3. Further, the CPU 105 determines whether the change amount of the VSWR is equal to or greater than the predetermined value A.

If the CPU 105 determines that the change amount of the VSWR is equal to or greater than the predetermined value A (YES in step S707), the CPU 105 determines that a foreign object is in the predetermined range. In this case, (YES in step S707), the process proceeds from step S707 to step S711.

If the CPU 105 determines that the change amount of the VSWR is less than the predetermined value A (NO in step S707), the CPU 105 determines that there is not any foreign object in the predetermined range. In this case, (NO in step S707), the process proceeds from step S707 to step S708.

In step S708, the CPU 105 determines whether the temperature of the power supply apparatus 100 detected by the temperature detection unit 102a is equal to or greater than a predetermined value C. In this case, by comparing the temperature of the power supply apparatus 100 with the predetermined value C, the CPU 105 determines whether the temperature of the power supply apparatus 100 is normal in a case where the power supply apparatus 100 supplies the third power to the electronic apparatus 200.

If the CPU 105 determines that the temperature of the power supply apparatus 100 detected by the temperature detection unit 102a is equal to or greater than the predetermined value C (YES in step S708), the CPU 105 determines that the temperature of the power supply apparatus 100 is abnormal. In this case (YES in step S708), the process proceeds from step S708 to step S709.

If the CPU 105 determines that the temperature of the power supply apparatus 100 detected by the temperature detection unit 102a is less than the predetermined value C (NO in step S708), the CPU 105 determines that the temperature of the power supply apparatus 100 is normal. In this case (YES in step S708), the process returns from step S708 to step S704.

In step S709, the CPU 105 controls one of the oscillator 101, the power transmission circuit 102, and the matching circuit 103 so as to stop supplying the third power to the electronic apparatus 200. In this case, the process proceeds from step S709 to step S710.

In step S710, the CPU 105 determines whether the temperature of the power supply apparatus 100 detected by the temperature detection unit 102a is equal to or greater than the predetermined value C, similar to step S708.

If the CPU 105 determines that the temperature of the power supply apparatus 100 detected by the temperature detection unit 102a is equal to or greater than the predetermined value C (YES in step S710), the CPU 105 repeats the process in step S710.

If the CPU 105 determines that the temperature of the power supply apparatus 100 detected by the temperature detection unit 102a is less than the predetermined value C (NO in step S710), the process proceeds from step S710 to step S711.

In step S711, the CPU 105 sets the power to be supplied to the electronic apparatus 200 to the first power and controls the oscillator 101, the power transmission circuit 102, and the matching circuit 103 so as to supply the first power to the electronic apparatus 200 via the power supply antenna 108.

If the process in step S709 is not performed, the CPU 105 controls the oscillator 101, the power transmission circuit 102, and the matching circuit 103 so as to stop supplying the third power to the electronic apparatus 200 before supplying the first power to the electronic apparatus 200. If the determination result is NO in step S702, NO in step S705, YES in step S706, or YES in step S707, the CPU 105 stops supplying the third power to the electronic apparatus 200 and then supplies the first power to the electronic apparatus 200.

In this case, the process proceeds from step S711 to step S712.

In step S712, the CPU 105 controls the modulation and demodulation circuit 104 so as to transmit a ninth command to the electronic apparatus 200. The ninth command is usable to notify the electronic apparatus 200 of stopping the power supply process. In this case, the process proceeds from step S712 to step S713.

In step S713, the CPU 105 determines whether the modulation and demodulation circuit 104 has received a response corresponding to the ninth command transmitted to the electronic apparatus 200 in step S712.

If the CPU 105 determines that the modulation and demodulation circuit 104 has received the response corresponding to the ninth command (YES in step S713), the CPU 105 determines that the completion of the power supply process performed by the power supply apparatus 100 has been notified to the electronic apparatus 200. In this case (YES in step S713), the process proceeds from step S713 to step S714.

If the CPU 105 determines that the modulation and demodulation circuit 104 has not received the response corresponding to the ninth command (NO in step S713), the CPU 105 determines that the completion of the power supply process performed by the power supply apparatus 100 has not been notified to the electronic apparatus 200. In this case (NO in step S713), the CPU 105 terminates the process of the flowchart illustrated in FIG. 7 and proceeds to step S510 of the detection process illustrated in FIG. 5 to perform the above-described process of step S510 and step S511.

In step S714, the CPU 105 controls the display unit 113 to display data indicating the state of the power supply apparatus 100.

For example, if in step S706 it is determined that the battery 210 of the electronic apparatus 200 is in a full-charge state, the CPU 105 can cause the display unit 113 to display data indicating the full-charge state of the electronic apparatus 200 as the data indicating the state of the power supply apparatus 100.

Further, if the foreign object is detected in step S707, the CPU 105 can cause the display unit 113 to display data indicating the presence of a foreign object in the vicinity of the power supply apparatus 100 as the data indicating the state of the power supply apparatus 100.

Further, if in step S708 if it is determined that the temperature of the power supply apparatus 100 is abnormal, the CPU 105 can cause the display unit 113 to display data indicating the abnormal temperature of the power supply apparatus 100 as the data indicating the state of the power supply apparatus 100.

Further, the CPU 105 can cause the display unit 113 to display information indicating an operation of the power supply apparatus 100 as the data indicating the state of the power supply apparatus 100. In this case, the process proceeds from step S714 to step S715.

In step S715, the CPU 105 controls the power supply apparatus 100 so as to change the operation mode from the power supply mode to the standby mode, similar to step S511. In this case, the CPU 105 terminates the process of the flowchart illustrated in FIG. 7.

The CPU 105 controls the timer 109 so as to measure the time elapsed after the operation mode of the power supply apparatus 100 is changed to the standby mode. When the time measured by the timer 109 has reached a predetermined time, the CPU 105 changes the operation mode of the power supply apparatus 100 from the standby mode to the power supply mode to perform process in step S501.

If in step S715 the first power is supplied to the electronic apparatus 200, the CPU 105 stops supplying the first power to the electronic apparatus 200 before changing the operation mode of the power supply apparatus 100 to the standby mode.

If the power transmission circuit 102 is generating the first power, the CPU 105 controls one of the oscillator 101, the power transmission circuit 102, and the matching circuit 103 so as to stop supplying the first power.

As described above, in step S708, the CPU 105 determines whether the temperature of the power supply apparatus 100 detected by the temperature detection unit 102a is equal to or greater than the predetermined value C. However, in step S708, the CPU 105 can determine whether the temperature of the power supply apparatus 100 detected by the temperature detection unit 102a is equal to or greater than a predetermined value C1 and is equal to or less than a predetermined value C2.

In this case, the predetermined value C1 is a minimum temperature of the power supply apparatus 100 in the state where the power supply apparatus 100 is supplying the third power to the electronic apparatus 200. Further, the predetermined value C2 is a maximum temperature of the power supply apparatus 100 in the state where the power supply apparatus 100 is supplying the third power to the electronic apparatus 200. The predetermined value C1 is lower than the predetermined value C2.

In this case, if the CPU 105 determines that the temperature of the power supply apparatus 100 detected by the temperature detection unit 102a is equal to or greater than the predetermined value C1 and is equal to or less than the predetermined value C2, the CPU 105 determines that the temperature of the power supply apparatus 100 is normal (NO in step S708). Further, if the CPU 105 determines that the temperature of the power supply apparatus 100 detected by the temperature detection unit 102a is less than the predetermined value C1 or is greater than the predetermined value C2, the CPU 105 determines that the temperature of the power supply apparatus 100 is abnormal (YES in step S708).

The CPU 105 can perform similar determination process in step S710.

The third power supplied to the electronic apparatus 200 in step S703 is continuously supplied from the power supply apparatus 100 to the electronic apparatus 200 via the power supply antenna 108 until the CPU 105 stops supplying the third power to the electronic apparatus 200 in step S709.

The third power supplied to the electronic apparatus 200 in step S703 is continuously supplied from the power supply apparatus 100 to the electronic apparatus 200 via the power supply antenna 108 until the CPU 105 stops supplying the third power to the electronic apparatus 200 in step S711.

The first power supplied to the electronic apparatus 200 in step S711 is continuously supplied from the power supply apparatus 100 to the electronic apparatus 200 via the power supply antenna 108 until the CPU 105 stops supplying the first power to the electronic apparatus 200 in step S715.

As described above, in step S706, the CPU 105 determines whether the battery 210 of the electronic apparatus 200 is in a full-charge state.

However, for example, in step S706, the CPU 105 can determine whether to stop the process for supplying the third power to the electronic apparatus 200. In this case, the CPU 105 can determine whether to stop the third power supply process by determining whether an error occurs in any one of the power supply apparatus 100 and the electronic apparatus 200.

In this case, if the CPU 105 determines that an error occurs in any one of the power supply apparatus 100 and the electronic apparatus 200, the CPU 105 stops supplying the third power to the electronic apparatus 200 and performs the process in step S711. Further, if the CPU 105 determines that no error occurs in the power supply apparatus 100 and the electronic apparatus 200, the CPU 105 does not stop supplying the third power to the electronic apparatus 200 and performs the process in step S707.

Further, for example, the CPU 105 can determine whether to stop supplying the third power to the electronic apparatus 200 by determining whether the electronic apparatus 200 has been removed from the predetermined range. In this case, if the CPU 105 detects that the electronic apparatus 200 has been removed from the predetermined range, the CPU 105 stops supplying the third power to the electronic apparatus 200 and performs the process in step S711. Further, if the CPU 105 detects that the electronic apparatus 200 has not been removed from the predetermined range, the CPU 105 does not stop supplying the third power to the electronic apparatus 200 and performs the process in step S707.

As described above, in step S714, the CPU 105 causes the display unit 113 to display the data indicating the state of the power supply apparatus 100. However, for example, if the power supply apparatus 100 is connected to an external display apparatus via a digital interface, the CPU 105 can control the external display apparatus to display the data indicating the state of the power supply apparatus 100.

In the first exemplary embodiment, example command reception process that can be performed by the electronic apparatus 200 is described in detail below with reference to flowcharts illustrated in FIG. 8, which is composed of FIGS. 8A and 8B, and FIG. 9. The command reception process illustrated in FIG. 8 is hereinafter referred to as "first command reception process." The command reception process illustrated in FIG. 9 is hereinafter referred to as "second command reception process." To realize the process of the flowcharts illustrated in FIG. 8 and FIG. 9, the CPU 205 executes the computer program stored in the ROM 206.

Figure 8:
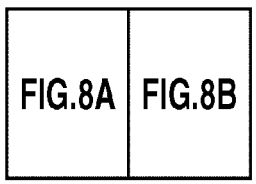
FIG. 8, which is composed of FIGS. 8A and 8B, is a flowchart illustrating first command reception process that is performed by an electronic apparatus according to the first and second exemplary embodiments.
Figure 8A:
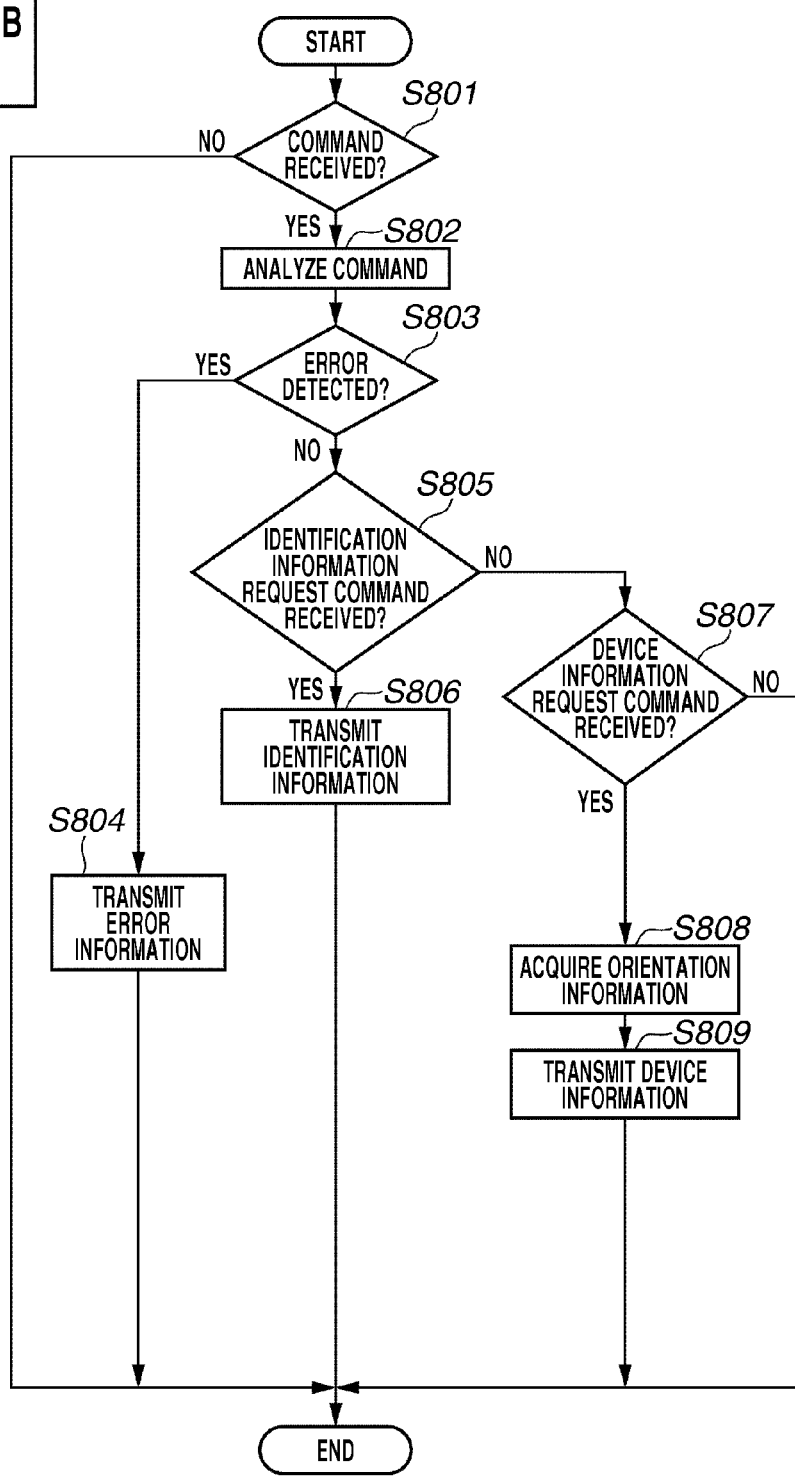
Figure 8B:
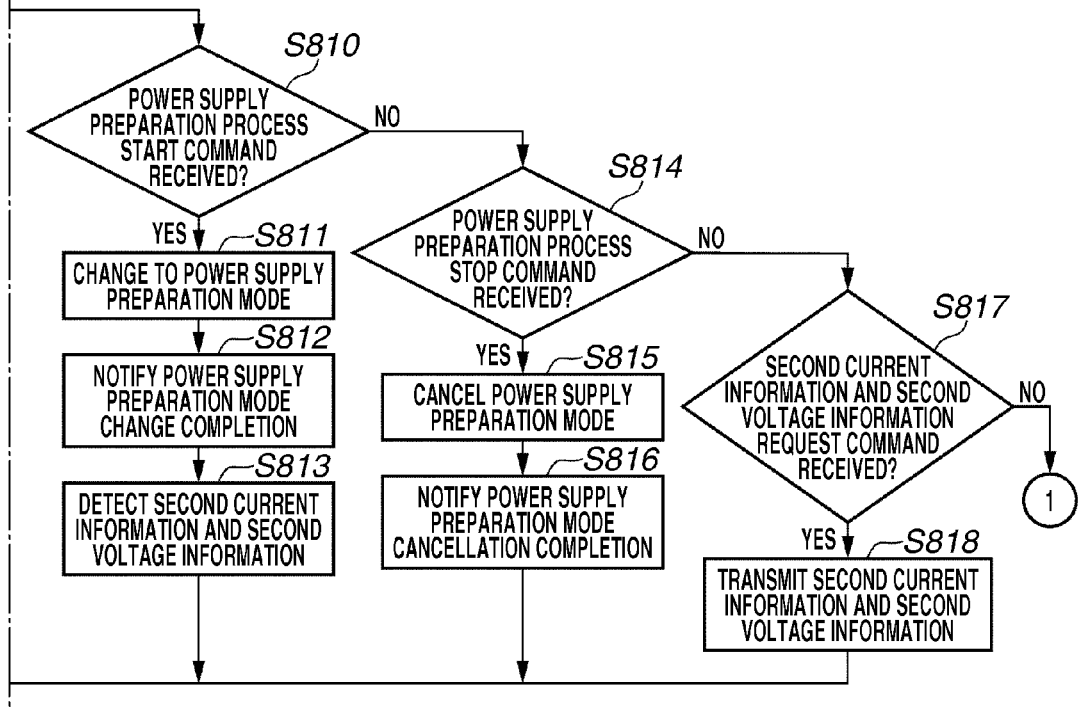
Figure 9:
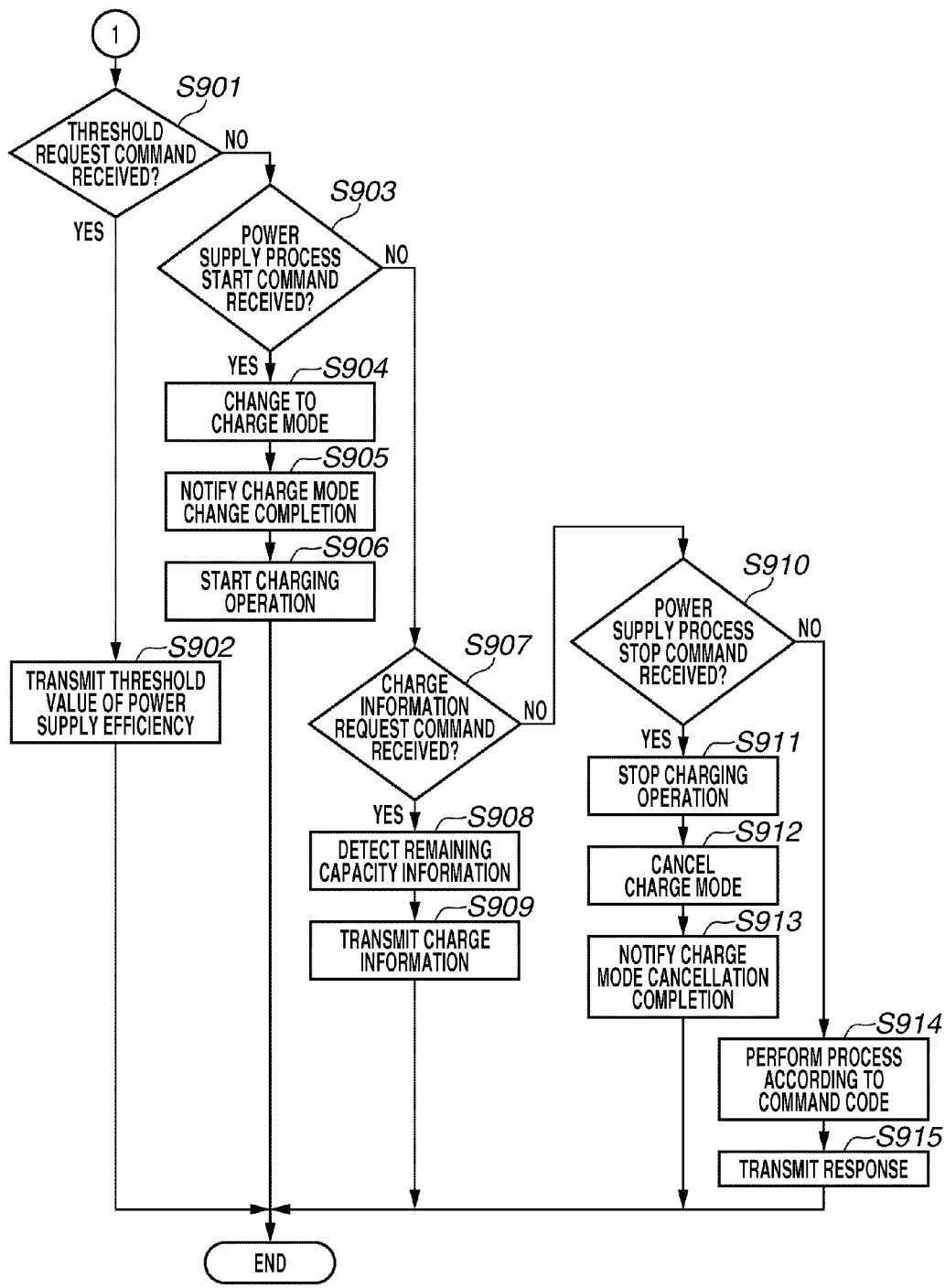
FIG. 9 is a flowchart illustrating second command reception process that is performed by the electronic apparatus according to the first and second exemplary embodiments.

The electronic apparatus 200 performs the first command reception process illustrated in FIG. 8. When the CPU 205 performs the first command reception process, the power supply apparatus 100 continuously supplies the first power (required to communicate with the electronic apparatus 200) to the electronic apparatus 200. Further, the CPU 205 can periodically perform the first command reception process illustrated in FIG. 8.

In step S801, the CPU 205 determines whether the modulation and demodulation circuit 204 has received a command from the power supply apparatus 100. If the CPU 205 determines that the modulation and demodulation circuit 204 has not received any command from the power supply apparatus 100 (NO in step S801), the CPU 205 terminates the process of the flowchart illustrated in FIG. 8. If the CPU 205 determines that the modulation and demodulation circuit 204 has received a command from the power supply apparatus 100 (YES in step S801), the process proceeds from step S801 to step S802.

In step S802, the CPU 205 controls the modulation and demodulation circuit 204 so as to analyze the command that the modulation and demodulation circuit 204 has received from the power supply apparatus 100. In this case, the process proceeds from step S802 to step S803. When the modulation and demodulation circuit 204 completes the analysis on the command, the modulation and demodulation circuit 209 supplies a command analysis result to the CPU 205.

In step S803, the CPU 205 determines whether the analysis result supplied from the modulation and demodulation circuit 204 includes a detected error. If the CPU 205 determines that the analysis result supplied from the modulation and demodulation circuit 204 includes a detected error (YES in step S803), the process proceeds from step S803 to step S804. If the CPU 205 determines that the analysis result supplied from the modulation and demodulation circuit 204 does not include any detected error (NO in step S803), the process proceeds from step S803 to step S805.

In step S804, the CPU 205 controls the modulation and demodulation circuit 204 so as to perform load modulation for transmitting error information indicating generation of the error as a response relating to the command transmitted from the power supply apparatus 100 to the power supply apparatus 100. In this case, the CPU 205 terminates the process of the flowchart illustrated in FIG. 8. The CPU 205 performs error process of solving the detected error.

In step S805, the CPU 205 determines whether the command received by the modulation and demodulation circuit 204 is the first command based on the analysis result supplied from the modulation and demodulation circuit 204. If the CPU 205 determines that the command received by the modulation and demodulation circuit 204 is not the first command (NO in step S805), the process proceeds from step S805 to step S807. If the CPU 205 determines that the command received by the modulation and demodulation circuit 204 is the first command (YES in step S805), the process proceeds from step S805 to step S806.

In step S806, the CPU 205 controls the modulation and demodulation circuit 204 so as to perform load modulation for transmitting ID information stored in the ROM 206 to the power supply apparatus 100 as a response relating to the first command. In this case, the CPU 205 terminates the process of the flowchart illustrated in FIG. 8.

In step S807, the CPU 205 determines whether the command received by the modulation and demodulation circuit 204 is the second command based on the analysis result supplied from the modulation and demodulation circuit 204. If the CPU 205 determines that the command received by the modulation and demodulation circuit 204 is not the second command (NO in step S807), the process proceeds from step S807 to step S810. If the CPU 205 determines that, the command received by the modulation and demodulation circuit 204 is the second command (YES in step S807), the process proceeds from step S807 to step S808.

In step S808, the CPU 205 controls the orientation sensor 216 so as to acquire the orientation information of the electronic apparatus 200. The CPU 205 records the orientation information of the electronic apparatus 200 acquired from the orientation sensor 216 in the RAM 207. In this case, the process proceeds from step S808 to step S809.

In step S809, the CPU 205 controls the matching circuit 202 and the modulation and demodulation circuit 204 so as to perform load modulation for transmitting the device information to the power supply apparatus 100 as a response relating to the second command. The device information transmitted in this case includes information indicating the apparatus name of the electronic apparatus 200, information indicating the product name of the electronic apparatus 200, and information indicating the manufacturer name of the electronic apparatus 200, which are read from the ROM 206.

Further, power receiving information included in the device information is information that the CPU 205 has read from the ROM 206. The orientation information included in the device information is information detected by the orientation sensor 216 in step S808. In this case, the CPU 205 terminates the process of the flowchart illustrated in FIG. 8.

In step S810, the CPU 205 determines whether the command received by the modulation and demodulation circuit 204 is the third command based on the analysis result supplied from the modulation and demodulation circuit 204. If the CPU 205 determines that the command received by the modulation and demodulation circuit 204 is not the third command (NO in step S810), the process proceeds from step S810 to step S814. If the CPU 205 determines that the command received by the modulation and demodulation circuit 204 is the third command (YES in step S810), the process proceeds from step S810 to step S811.

In step S811, the CPU 205 changes the operation mode of the electronic apparatus 200 to a power supply preparation mode.

The power supply preparation mode is a mode for turning the switching unit 215 and the switching unit 218 off to prevent the power, when supplied from the power supply apparatus 100 to the electronic apparatus 200, from being supplied to the communication unit 212, the imaging unit 213, the recording unit 217, the battery 210, and the charging control unit 209.

When the operation mode of the electronic apparatus 200 is the power supply preparation mode, power can be supplied from the power supply apparatus 100 to each of the CPU 205, the timer 211, the matching circuit 202, the modulation and demodulation circuit 204, the rectifying and smoothing circuit 203, and the current and voltage detection unit 214. Further, when the operation mode of the electronic apparatus 200 is the power supply preparation mode, power can be supplied from the power supply apparatus 100 to each of the ROM 206, the RAM 207, and the regulator 208. Further, it is useful that the power supply apparatus 100 supplies power to the orientation sensor 216 when the operation mode of the electronic apparatus 200 is the power supply preparation mode.

When the operation mode of the electronic apparatus 200 has been changed to the power supply preparation mode, the CPU 205 causes the communication unit 212 to stop receiving video data and turns off the switching unit 218. Similarly, when the operation mode of the electronic apparatus 200 has been changed to the power supply preparation mode, the CPU 205 causes the communication unit 212 to stop transmitting video data and turns off the switching unit 218.

Further, when the operation mode of the electronic apparatus 200 has been changed to the power supply preparation mode, the CPU 205 causes the imaging unit 213 to stop performing a shooting operation and turns off the switching unit 218. Further, when the operation mode of the electronic apparatus 200 has been changed to the power supply preparation mode, the CPU 205 causes the recording unit 217 to stop recording and reproducing operations and turns off the switching unit 218.

Further, when the operation mode of the electronic apparatus 200 has been changed to the power supply preparation mode, the CPU 205 causes the charging control unit 209 to stop charging the battery 210 and turns off the switching unit 215.

When the modulation and demodulation circuit 204 has received the third command, the CPU 205 changes the operation mode of the electronic apparatus 200 to the power supply preparation mode to detect the second current information and the second voltage information in a state where the power consumed by the electronic apparatus 200 is controlled to be constant. Therefore, when the power supply apparatus 100 performs the power supply preparation process, the current and voltage detection unit 214 detects the second current information and the second voltage information in a state where the power consumed by the electronic apparatus 200 is constant.

In this case, the process proceeds from step S811 to step S812.

In step S812, the CPU 205 controls the modulation and demodulation circuit 204 so as to perform load modulation for transmitting completion information (indicating that the operation mode of the electronic apparatus 200 has been changed to the power supply preparation mode) to the power supply apparatus 100 as a response relating to the third command. In this case, the process proceeds from step S812 to step S813.

In step S813, the CPU 205 controls the current and voltage detection unit 219 so as to detect the second current information and the second voltage information. Further, the CPU 205 records the second current information and the second voltage information detected by the current and voltage detection unit 214 in the RAM 207. In this case, the CPU 205 terminates the process of the flowchart illustrated in FIG. 8.

In step S814, the CPU 205 determines whether the command received by the modulation and demodulation circuit 204 is the fourth command based on the analysis result supplied from the modulation and demodulation circuit 204. If the CPU 205 determines that the command received by the modulation and demodulation circuit 204 is not the fourth command (NO in step S814), the process proceeds from step S814 to step S817. If the CPU 205 determines that the command received by the modulation and demodulation circuit 204 is the fourth command (YES in step S814), the process proceeds from step S814 to step S815.

In step S815, the CPU 205 releases the electronic apparatus 200 from the power supply preparation mode by changing the operation mode of the electronic apparatus 200 from the power supply preparation mode to the previous mode. In this case, the process proceeds from step S815 to step S816.

For example, if video data has been transmitted from the communication unit 212 to the power supply apparatus 100 before the operation mode of the electronic apparatus 200 is changed to the power supply preparation mode, the CPU 205 controls the communication unit 212 so as to resume the process for transmitting the video data to the power supply apparatus 100. In this case, the communication unit 212 can resume transmitting the video data to the power supply apparatus 100 from an interrupt point at which the electronic apparatus 200 has changed the operation mode to the power supply preparation mode. Alternatively, the communication unit 212 can restart the video data transmission process from the beginning.

For example, if video data has been received from the power supply apparatus 100 by the communication unit 212 before the operation mode of the electronic apparatus 200 is changed to the power supply preparation mode, the CPU 205 controls the communication unit 212 so as to resume the process for receiving the video data from the power supply apparatus 100. In this case, the communication unit 212 can resume receiving the video data from an interrupt point at which the electronic apparatus 200 has changed the operation mode to the power supply preparation mode. Alternatively, the communication unit 212 can restart the video data reception process from the beginning.

For example, if a shooting operation has been performed by the imaging unit 213 before the operation mode of the electronic apparatus 200 is changed to the power supply preparation mode, the CPU 205 controls the imaging unit 213 so as to resume the shooting operation. In this case, the imaging unit 213 can resume the shooting operation from an interrupt point at which the electronic apparatus 200 has changed the operation mode to the power supply preparation mode. Alternatively, the imaging unit 213 can restart the shooting operation from the beginning.

In step S816, the CPU 205 controls the modulation and demodulation circuit 204 so as to perform load modulation for transmitting information indicating that the electronic apparatus 200 has been released from the power supply preparation mode to the power supply apparatus 100, as a response relating to the fourth command. In this case, the CPU 205 terminates the process of the flowchart illustrated in FIG. 8.

In step S817, the CPU 205 determines whether the command received by the modulation and demodulation circuit 204 is the fifth command based on the analysis result supplied from the modulation and demodulation circuit 204. If the CPU 205 determines that the command received by the modulation and demodulation circuit 204 is not the fifth command (NO in step S817), the process proceeds from step S817 to step S901 illustrated in FIG. 9. If the CPU 205 determines that the command received by the modulation and demodulation circuit 204 is the fifth command (YES in step S817), the process proceeds from step S817 to step S818.

In step S818, the CPU 205 controls the modulation and demodulation circuit 204 so as to perform load modulation for transmitting the second current information of the electronic apparatus 200 and the second voltage information of the electronic apparatus 200 to the power supply apparatus 100 as a response relating to the fifth command. The second current information and the second voltage information are the information detected by the current and voltage detection unit 214 in step S813 and recorded in the RAM 207. In this case, the CPU 205 terminates the process of the flowchart illustrated in FIG. 8.

Next, in step S901, the CPU 205 determines whether the command received by the modulation and demodulation circuit 204 is the sixth command based on the analysis result supplied from the modulation and demodulation circuit 204. If the CPU 205 determines that the command received by the modulation and demodulation circuit 204 is not the sixth command (NO in step S901), the process proceeds from step S901 to step S903. If the CPU 205 determines that the command received by the modulation and demodulation circuit 204 is the sixth command (YES in step S901), the process proceeds from step S901 to step S902.

In step S902, the CPU 205 controls the modulation and demodulation circuit 204 so as to perform load modulation for transmitting the predetermined value B to the power supply apparatus 100 as a response relating to the sixth command. The predetermined value B is the threshold value relating to power supply efficiency, which the CPU 205 has read from the ROM 206. In this case, the CPU 205 terminates the process of the flowchart illustrated in FIG. 9.

In step S903, the CPU 205 determines whether the command received by the modulation and demodulation circuit 204 is the seventh command based on the analysis result supplied from the modulation and demodulation circuit 204. If the CPU 205 determines that the command received by the modulation and demodulation circuit 204 is not the seventh command (NO in step S903), the process proceeds from step S903 to step S907. If the CPU 205 determines that the command received by the modulation and demodulation circuit 204 is the seventh command (YES in step S903), the process proceeds from step S903 to step S904.

In step S904, the CPU 205 changes the operation mode of the electronic apparatus 200 to the charge mode.

The charge mode is a mode for charging the battery 210 based on the power supplied from the power supply apparatus 100 to the electronic apparatus 200.

When the operation mode of the electronic apparatus 200 is the charge mode, power can be supplied from the power supply apparatus 100 to each of the CPU 205, the timer 211, the matching circuit 202, the modulation and demodulation circuit 204, the rectifying and smoothing circuit 203, the current and voltage detection unit 214, the ROM 206, the RAM 207, and the regulator 208. Further, when the electronic apparatus 200 is the charge mode, power can be supplied from the power supply apparatus 100 to the charging control unit 209 and the battery 210 via the switching unit 215.

Further, it is useful that the power supply apparatus 100 supplies power to the orientation sensor 216 when the operation mode of the electronic apparatus 200 is the charge mode.

When the operation mode of the power supply apparatus 100 is changed to the charge mode, the CPU 205 determines whether the communication unit 212, the imaging unit 213, and the recording unit 217 can operate by using the power supplied from the power supply apparatus 100, while charging the battery 210.

If the CPU 205 determines that the communication unit 212, the imaging unit 213, and the recording unit 217 cannot operate by using the power supply from the power supply apparatus 100 while charging the battery 210, the CPU 205 turns on the switching unit 215 and turns off the switching unit 218.

In this case, the CPU 205 permits the charging control unit 209 and the battery 210 to receive the power supplied from the power supply apparatus 100 via the switching unit 215 and prevents the communication unit 212, the imaging unit 213, and the recording unit 217 from receiving the power supplied from the power supply apparatus 100 via the switching unit 218. Thus, the CPU 205 enables the charging control unit 209 to charge the battery 210 preferentially and prevents the communication unit 212, the imaging unit 213, and the recording unit 217 from performing their operations.

If the CPU 205 determines that the charging control unit 209, the communication unit 212, the imaging unit 213, and the recording unit 217 can perform their operations by using the power supply from the power supply apparatus 100, the CPU 205 turns on the switching unit 215 and the switching unit 218. In this case, the power supplied from the power supply apparatus 100 can be supplied to each unit of the electronic apparatus 200.

In this case, the CPU 205 causes the charging control unit 209 to perform the process for charging the battery 210 and causes the communication unit 212, the imaging unit 213, and the recording unit 217 to perform their operations. In this case, the process proceeds from step S904 to step S905.

In step S905, the CPU 205 controls the modulation and demodulation circuit 204 so as to perform load modulation for transmitting completion information indicating that the operation mode of the electronic apparatus 200 has been changed to the charge mode, as a response relating to the seventh command, to the power supply apparatus 100. In this case, the process proceeds from step S905 to step S906.

In step S906, the CPU 205 controls the charging control unit 209 so as to start charging the battery 210 by using the power supply via the switching unit 215 from the regulator 208. In this case, the CPU 205 completes the process of the flowchart illustrated in FIG. 9.

In step S907, the CPU 205 determines whether the command received by the modulation and demodulation circuit 204 is the eighth command based on the analysis result supplied from the modulation and demodulation circuit 204. If the CPU 205 determines that the command received by the modulation and demodulation circuit 204 is not the eighth command (NO in step S907), the process proceeds from step S907 to step S910. If the CPU 205 determines that the command received by the modulation and demodulation circuit 204 is the eighth command (YES in step S907), the process proceeds from step S907 to step S908.

In step S908, the CPU 205 controls the charging control unit 209 so as to acquire remaining capacity information of the electronic apparatus 200. The CPU 205 records the remaining capacity information of the electronic apparatus 200 detected by the charging control unit 209 in the RAM 207. In this case, the process proceeds from step S908 to step S909.

In step S909, the CPU 205 controls the modulation and demodulation circuit 204 so as to perform load modulation for transmitting the charge information of the electronic apparatus 200, as a response relating to the eighth command, to the power supply apparatus 100. In this case, the CPU 205 terminates the process of the flowchart illustrated in FIG. 9. The charge information of the electronic apparatus 200 to be transmitted to the power supply apparatus 100 in step S909 includes the remaining capacity information acquired in step S908.

In step S910, the CPU 205 determines whether the command received by the modulation and demodulation circuit 204 is the ninth command based on the analysis result supplied from the modulation and demodulation circuit 204. If the CPU 205 determines that the command received by the modulation and demodulation circuit 204 is not the ninth command (NO in step S910), the process proceeds from step S910 to step S914. If the CPU 205 determines that the command received by the modulation and demodulation circuit 204 is the ninth command (YES in step S910), the process proceeds from step S910 to step S911.

In step S911, the CPU 205 controls the charging control unit 209 so as to stop charging the battery 210. In this case, the process proceeds from step S911 to step S912. In step S911, the CPU 205 can turn off the switching unit 215 to stop charging the battery 210.

In step S912, the CPU 205 releases the electronic apparatus 200 from the charge mode by changing the operation mode of the electronic apparatus 200 from the charge mode to the previous mode. In this case, the process proceeds from step S912 to step S913.

When the operation mode of the electronic apparatus 200 has been released from the charge mode, the CPU 205 turns off the switching unit 215 to prevent the battery 210 from receiving the power from the regulator 208.

In step S913, the CPU 205 controls the modulation and demodulation circuit 204 so as to perform load modulation for transmitting information indicating that the electronic apparatus 200 has been released from the charge mode, as a response relating to the eighth command, to the power supply apparatus 100. In this case, the CPU 205 terminates the process of the flowchart illustrated in FIG. 9.

In step S914, the CPU 205 controls the electronic apparatus 200 so as to perform predetermined process according to a command code obtainable from the analysis result supplied from the modulation and demodulation circuit 204. In this case, the process proceeds from step S914 to step S915.

In step S915, the CPU 205 controls the modulation and demodulation circuit 204 so as to perform load modulation for transmitting a response relating to the command received by the modulation and demodulation circuit 204 to the power supply apparatus 100. In this case, the CPU 205 terminates the process of the flowchart illustrated in FIG. 9.

If the charging control unit 209 starts charging the battery 210 in step S906, the CPU 205 prevents the charging control unit 209 from stopping charging the battery 210 until the modulation and demodulation circuit 204 receives the ninth command. Further, the CPU 205 controls the charging control unit 209 so as to stop charging the battery 210 if it is determined that the battery 210 is in a full-charge state, even when the modulation and demodulation circuit 204 has not received the ninth command from the power supply apparatus 100.

Further, the CPU 205 controls the charging control unit 209 so as to stop charging the battery 210 if it is determined that an error occurs in the electronic apparatus 200 even when the modulation and demodulation circuit 204 has not received the ninth command from the power supply apparatus 100. Further, the CPU 205 controls the charging control unit 209 so as to stop charging the battery 210 if it is determined that the battery 210 has been removed even when the modulation and demodulation circuit 204 has not received the ninth command from the power supply apparatus 100.

Further, the power supply apparatus 100 according to the first exemplary embodiment can perform the above-described process for a plurality of electronic apparatuses.

As described above, in the power supply system according to the first exemplary embodiment, the power supply apparatus 100 can detect a foreign object if the distance between the power supply apparatus 100 and the foreign object is in the predetermined range.

Even when the power supply apparatus 100 acquires identification information in response to an identification information request command, if an electronic apparatus having the identification information is not the predetermined apparatus (NO in step S505), the power supply apparatus 100 determines that the electronic apparatus existing in the predetermined range is a foreign object.

Thus, the power supply apparatus 100 can detect a foreign object even when the foreign object includes a transmission unit capable of transmitting a response relating to the command sent from the power supply apparatus 100 exists in the predetermined range.

Further, even when the electronic apparatus 200 having identification information that corresponds to an identification information acquisition command is the predetermined apparatus, if the change amount of the VSWR is equal to or greater than the predetermined value A (YES in step S508), the power supply apparatus 100 can detect a foreign object existing in the predetermined range.

Thus, even when a foreign object and an electronic apparatus identified as the predetermined apparatus both exist in the predetermined range, the power supply apparatus 100 can detect the foreign object.

Further, even when the change amount of the VSWR is less than the predetermined value A, if it is determined that the power supply efficiency is less than the predetermined value B (NO in step S512), the power supply apparatus 100 can detect a foreign object existing in the predetermined range.

Thus, even when a foreign object and an electronic apparatus identified as the predetermined apparatus both exist in the predetermined range, the power supply apparatus 100 can detect the foreign object.

Further, before performing the power supply process, the power supply apparatus 100 determines whether a foreign object exists in the predetermined range based on at least one of the process for detecting the foreign object based on the VSWR and the process for detecting the foreign object based on the power supply efficiency.

Therefore, if the power supply apparatus 100 detects that a foreign object exists in the predetermined range, the power supply apparatus 100 does not supply power to the foreign object. Further, if the power supply apparatus 100 cannot detect any foreign object in the predetermined range, the power supply apparatus 100 supplies power to the electronic apparatus identified as the predetermined apparatus.

Further, even when the power supply process is performed for an electronic apparatus identified as the predetermined apparatus, if the change amount of the VSWR is equal to or greater than the predetermined value A (YES in step S707), the power supply apparatus 100 detects that a foreign object exists in the predetermined range.

Even when a foreign object is placed in the predetermined range while the power supply process is performed for an electronic apparatus identified as the predetermined apparatus, the power supply apparatus 100 can detect the foreign object.

Further, when the power supply apparatus 100 performs power supply process, the power supply apparatus 100 determines whether a foreign object exist in the predetermined range based on the process for detecting the foreign object based on the VSWR.

Therefore, if the foreign object is detected in the predetermined range, the power supply apparatus 100 can stop power supply process to prevent the foreign object from receiving power. Further, if the power supply apparatus 100 cannot detect any foreign object in the predetermined range, the power supply apparatus 100 can continuously supply power to the electronic apparatus identified as the predetermined apparatus.

Accordingly, the power supply apparatus 100 can detect a foreign object and perform power supply process appropriately based on a detection result of the foreign object.

When the foreign object is detected, the power supply apparatus 100 sets the externally output power value to be lower compared to the present power value (predetermined value). Further, if no foreign object is detected, it is useful that the power supply apparatus 100 increases the externally output power value to be a value comparable to or greater than the present power value.

Hereinafter, a second exemplary embodiment of the present invention is described below with reference to FIG. 10, FIG. 11, and FIG. 12. The second exemplary embodiment includes a configuration similar to that described in the first exemplary embodiment and process and operations similar to those described in first exemplary embodiment, although the descriptions thereof are not repeated.

A power supply system according to the second exemplary embodiment is similar to the power supply system described in the first exemplary embodiment with reference to FIG. 1.

As described above, when the electronic apparatus 200 according to the first exemplary embodiment receives the sixth command, the electronic apparatus 200 reads the predetermined value B from the ROM 206 and transmits the readout predetermined value B as a response relating to the sixth command to the power supply apparatus 100.

On the other hand, when the electronic apparatus 200 according to the second exemplary embodiment receives the sixth command, the electronic apparatus 200 detects the predetermined value B based on a load table as described below, and transmits the detected predetermined value B as a response relating to the sixth command to the power supply apparatus 100. The load table is stored beforehand in the ROM 206.

In the load table, the predetermined value B is associated with information indicating the operational state of the electronic apparatus 200 and the power consumption in the electronic apparatus 200. The operational state of the electronic apparatus 200 indicates a load of the electronic apparatus 200 in operation. The power consumption in the electronic apparatus 200 indicates power consumed by the load of the electronic apparatus 200 in operation.

In the first exemplary embodiment, when the power supply apparatus 100 performs power supply process, the power supply apparatus 100 determines whether a foreign object is in the predetermined range by performing the process for detecting the foreign object based on the VSWR.

On the other hand, in the second exemplary embodiment, when the power supply apparatus 100 performs power supply process, the power supply apparatus 100 determines whether a foreign object is in the predetermined range by performing the process for detecting the foreign object based on the VSWR and the process for detecting the foreign object based on the power supply efficiency.

In the second exemplary embodiment, when the power supply apparatus 100 performs power supply process, the power supply apparatus 100 can determine whether a foreign object is in the predetermined range by performing at least one of the process for detecting the foreign object based on the VSWR and the process for detecting the foreign object based on the power supply efficiency.

Detection process according to the second exemplary embodiment is similar to the detection process described in the first exemplary embodiment with reference to FIG. 5. Further, device information acquisition process according to the second exemplary embodiment is similar to the device information acquisition process described in the first exemplary embodiment with reference to FIG. 6, although the descriptions thereof are not repeated.

Next, the power supply control process that can be performed by the power supply apparatus 100 according to the second exemplary embodiment is described in detail below with reference to the flowchart illustrated in FIG. 10. The power supply control process illustrated in FIG. 10 is performed by the CPU 105 in step S515 of FIG. 5.

Figure 10:
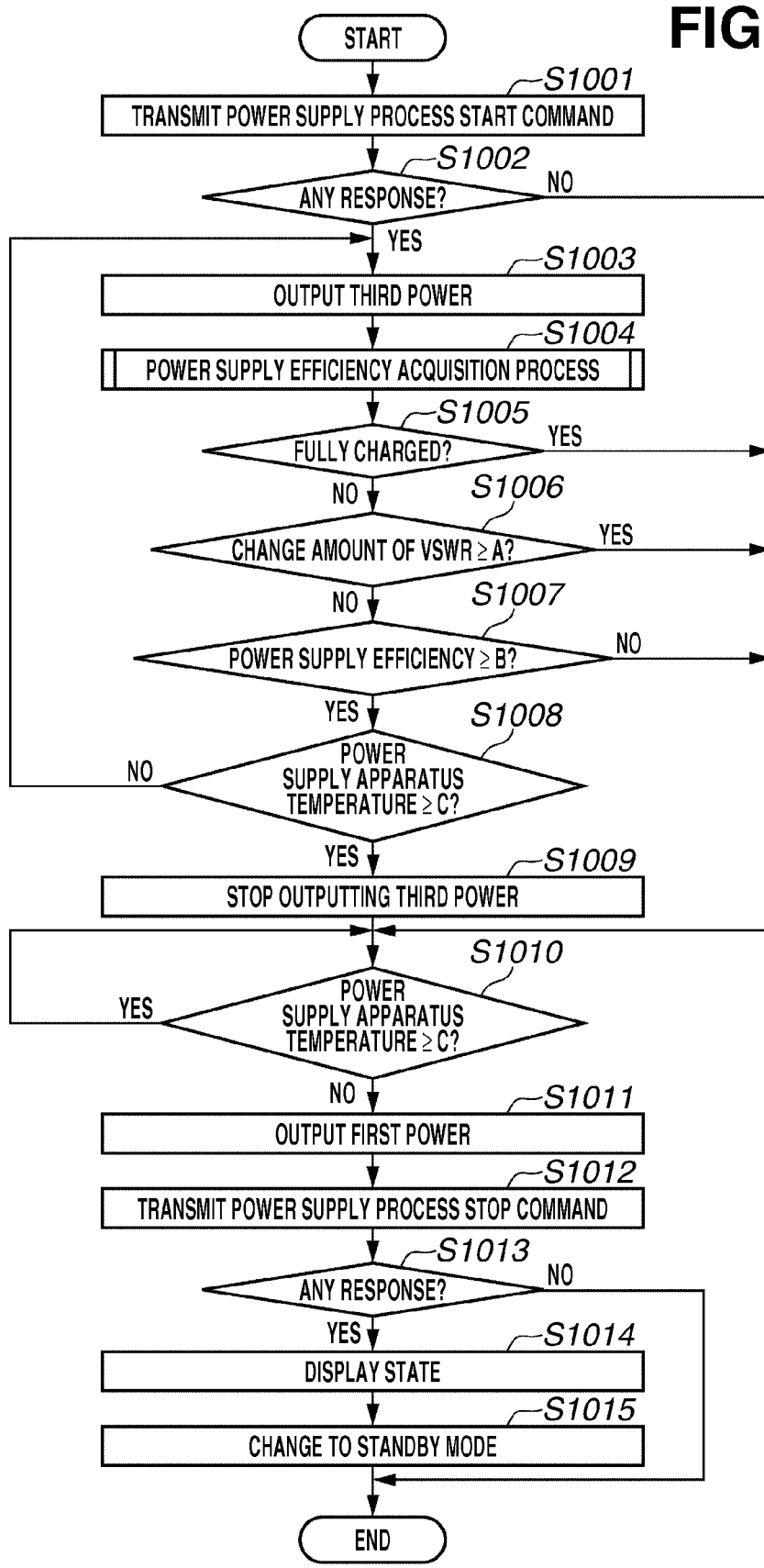
FIG. 10 is a flowchart illustrating power supply control process that is performed by the power supply apparatus according to the second exemplary embodiment.

The CPU 105 performs the power supply control process illustrated in FIG. 10 for an electronic apparatus selected as a power supply target in step S514.

Hereinafter, an example of the power supply control process to be performed by the CPU 105 when the electronic apparatus 200 is selected as a power supply target in step S514 is described.

Process to be performed in step S1001 to step S1003 of the power supply control process illustrated in FIG. 10 is similar to the process performed in step S701 to step S703 of the power supply control process illustrated in FIG. 7, and therefore the description thereof is not repeated. Further, process to be performed in step S1005 to step S1006 of the power supply control process illustrated in FIG. 10 is similar to the process performed in step S706 to step S707 of the power supply control process illustrated in FIG. 7 and therefore the description thereof is not repeated.

Further, process to be performed in step S1008 to step S1015 of the power supply control process illustrated in FIG. 10 is similar to the process performed in step S708 to step S715 of the power supply control process illustrated in FIG. 7, and therefore the description thereof is not repeated.

In step S1003, the CPU 105 supplies the third power to the electronic apparatus 200 via the power supply antenna 108. Then, the process proceeds from step S1003 to step S1004.

In step S1004, the CPU 105 performs power supply efficiency acquisition process, as described in detail below. In the power supply efficiency acquisition process, the CPU 105 can acquire the predetermined value B (i.e., a threshold value corresponding to the power supply efficiency) and the power supply efficiency. The predetermined value B and the power supply efficiency are stored in the RAM 107. In this case, the process proceeds from step S1004 to step S1005.

If the CPU 105 determines that the change amount of the VSWR is less than the predetermined value A (NO in step S1006), the CPU 105 determines that there is not any foreign object in the predetermined range. In this case (NO in step S1006), the process proceeds from step S1006 to step S1007.

In step S1007, the CPU 105 determines whether the power supply efficiency acquired in step S1004 is equal to or greater than the predetermined value B acquired from the electronic apparatus 200 in step S1004.

If the CPU 105 determines that the power supply efficiency is equal to or greater than the predetermined value B (YES in step S1007), the process proceeds from step S1007 to step S1008. If the CPU 105 determines that the power supply efficiency is less than the predetermined value B (NO in step S1007), the process proceeds from step S1007 to step S1010.

Next, the power supply efficiency acquisition process to be performed in step S1004 of the power supply control process illustrated in FIG. 10 is described in detail below with reference to FIG. 11.

In step S1101, the CPU 105 acquires the first current information and the first voltage information detected by the reflected power detection circuit 114 and records the acquired information in the RAM 107. In this case, the process proceeds from step S1101 to step S1102.

In step S1102, the CPU 105 controls the modulation and demodulation circuit 104 so as to transmit the fifth command to the electronic apparatus 200. In this case, the process proceeds from step S1102 to step S1103.

If the CPU 205 determines that the command received by the modulation and demodulation circuit 204 is the fifth command, the CPU 205 detects the second current information and the second voltage information to transmit a response relating to the fifth command to the power supply apparatus 100.

In this case, if the electronic apparatus 200 is charging the battery 210, the second current information and the second voltage information can be detected by the current and voltage detection unit 214 in the ON state of the switching unit 215. Further, in a case where the electronic apparatus 200 causes the communication unit 212, the imaging unit 213, and the recording unit 217 to perform their operations while charging the battery 210, the second current information and the second voltage information can be detected by the current and voltage detection unit 214 in the ON state of the switching unit 215 and the switching unit 218.

When the second current information and the second voltage information detected by the current and voltage detection unit 214 are supplied to the CPU 205, the CPU 205 transmits the supplied information (i.e., the second current information and the second voltage information) as a response relating to the fifth command to the power supply apparatus 100. In this case, the CPU 205 controls the modulation and demodulation circuit 204 so as to perform load modulation for transmitting the second current information and the second voltage information to the power supply apparatus 100.

In step S1103, the CPU 105 determines whether the modulation and demodulation circuit 104 has received the second current information of the electronic apparatus 200 and the second voltage information of the electronic apparatus 200 as a response relating to the fifth command transmitted to the electronic apparatus 200 in step S1102.

If the CPU 105 determines that the modulation and demodulation circuit 104 has received the second current information of the electronic apparatus 200 and the second voltage information of the electronic apparatus 200 (YES in step S1103), the CPU 105 stores the received information (i.e., the second current information and the second voltage information) in the RAM 107.

In this case (YES in step S1103), the process proceeds from step S1103 to step S1104.

If the CPU 105 determines that the modulation and demodulation circuit 104 has not received the second current information of the electronic apparatus 200 and the second voltage information of the electronic apparatus 200 (NO in step S1103), the CPU 105 determines that the power supply efficiency cannot be calculated. In this case (NO in step S1103), the CPU 105 terminates the process of the flowchart illustrated in FIG. 11. The process proceeds to step S1010 of the detection process illustrated in FIG. 10.

In this case (NO in step S1103), the CPU 105 cannot calculate the power supply efficiency to be used in the process of step S1007. Therefore, the CPU 105 cannot detect a foreign object based on the power supply efficiency although the CPU 105 can detect a foreign object based on the change amount of the VSWR.

In step S1104, the CPU 105 controls the modulation and demodulation circuit 104 so as to transmit the sixth command to the electronic apparatus 200. In this case, the process proceeds from step S1104 to step S1105.

In the second exemplary embodiment, if the sixth command is transmitted from the power supply apparatus 100 to the electronic apparatus 200, the CPU 205 determines whether the command received by the modulation and demodulation circuit 204 is the sixth command based on the analysis result supplied from the modulation and demodulation circuit 204.

If the CPU 205 determines that the command received by the modulation and demodulation circuit 204 is the sixth command, the CPU 205 detects the predetermined value B to be transmitted to the power supply apparatus 100 as a response relating to the sixth command.

The predetermined value B described in the second exemplary embodiment is variable depending on the power consumed by the electronic apparatus 200.

The CPU 205 detects the power consumed by the electronic apparatus 200 and detects the predetermined value B based on the detected power consumption and the load table stored in the ROM 206.

Hence, the CPU 205 acquires information indicating the power consumed by the power supply apparatus 100 based on the information detected by the current and voltage detection unit 214. In this case, the CPU 205 detects the information indicating the power consumed by the electronic apparatus 200 based on a product of the second current information and the second voltage information detected by the current and voltage detection unit 214.

When the information indicating the power consumed by the electronic apparatus 200 is calculated, the CPU 205 detects the predetermined value B based on the information indicating the power consumed by the electronic apparatus 200 and the load table.

Figure 12:
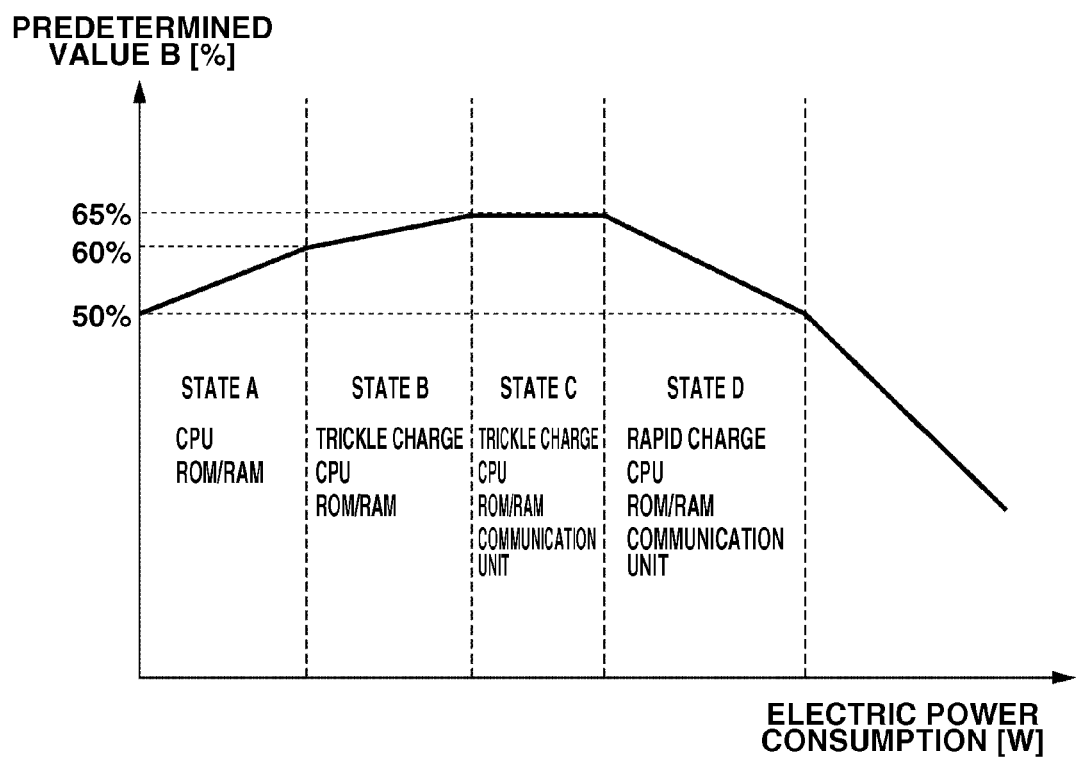
FIG. 12 illustrates an example of a load table according to the second exemplary embodiment.

FIG. 12 illustrates an example of the load table stored in the ROM 206.

In the load table, as illustrated in FIG. 12, the predetermined value B is associated with the power consumed by the electronic apparatus 200 and the operational state of the electronic apparatus 200.

In the load table, the operational states of the electronic apparatus 200 associated with the power consumed by the electronic apparatus 200 are state A, state B, state C, and state D.

The state A is an operational state of the electronic apparatus 200 that corresponds to the power consumed by the CPU 205, the ROM 206, and the RAM 207 of the electronic apparatus 200. When the operational state of the electronic apparatus 200 is the state A, the CPU 205 does not cause each unit of the electronic apparatus 200 except for the CPU 205, the ROM 206, and the RAM 207 to perform its operation. When the operational state of the electronic apparatus 200 is the state A, the communication unit 212 does not communicate with the communication unit 112 and the imaging unit 213 does not capture an image of an object, and the charging control unit 209 does not charge the battery 210.

The state B is an operational state of the electronic apparatus 200 that corresponds to the power consumed by the CPU 205, the ROM 206, the RAM 207, the charging control unit 209, and the battery 210 of the electronic apparatus 200. When the operational state of the electronic apparatus 200 is the state B, the CPU 205 does not cause each unit of the electronic apparatus 200 except for the CPU 205, the ROM 206, the RAM 207, the charging control unit 209, and the battery 210 to perform its operation. When the operational state of the electronic apparatus 200 is the state B, the communication unit 212 does not communicate with the communication unit 112 and the imaging unit 213 does not capture an image of an object. However, the charging control unit 209 performs trickle charging for the battery 210.

The state C is an operational state of the electronic apparatus 200 that corresponds to the power consumed by the CPU 205, the ROM 206, the RAM 207, the charging control unit 209, the battery 210, the communication unit 212, the imaging unit 213, the recording unit 217, and the recording medium 217a of the electronic apparatus 200. When the operational state of the electronic apparatus 200 is the state C, the CPU 205 does not cause each unit of the electronic apparatus 200 except for the CPU 205, the ROM 206, the RAM 207, the charging control unit 209, the battery 210, the communication unit 212, the recording unit 217, and the recording medium 217a to perform its operation.

When the operational state of the electronic apparatus 200 is the state C, the imaging unit 213 does not capture an image of an object. However, the communication unit 212 transmits and receives video data and audio data to and from the communication unit 112. The charging control unit 209 performs the trickle charging for the battery 210. When the operational state of the electronic apparatus 200 is the state C, the recording unit 217 reads video data and audio data from the recording medium 217a to transmit the readout data to the power supply apparatus 100 via the communication unit 212. Further, the recording unit 217 records video data and audio data in the recording medium 217a if the video data and the audio data have been received by the communication unit 212.

The state D is an operational state of the electronic apparatus 200 that corresponds to the power consumed by the CPU 205, the ROM 206, the RAM 207, the charging control unit 209, the battery 210, the communication unit 212, and the imaging unit 213, the recording unit 217, and the recording medium 217a of the electronic apparatus 200. When the operational state of the electronic apparatus 200 is the state D, the CPU 205 does not cause each unit of the electronic apparatus 200 except for the CPU 205, the ROM 206, the RAM 207, the charging control unit 209, the battery 210, the communication unit 212, the recording unit 217, and the recording medium 217a to perform its operation.

When the operational state of the electronic apparatus 200 is the state D, the imaging unit 213 does not capture an image of an object. However, the communication unit 212 transmits and receives video data and audio data to and from the communication unit 112. The charging control unit 209 performs rapid charging for the battery 210. When the operational state of the electronic apparatus 200 is the state D, the recording unit 217 reads video data and audio data from the recording medium 217a to transmit the readout data to the power supply apparatus 100 via the communication unit 212. Further, the recording unit 217 records video data and audio data in the recording medium 217a if the video data and the audio data have been received by the communication unit 212.

The operational state of the electronic apparatus 200 is not limited to the above-described states (i.e., state A, state B, state C, and state D) and can include any other state.

The CPU 205 can detect the operational state of the electronic apparatus 200 based on the information indicating the power consumed by the electronic apparatus 200 and the load table.

If the CPU 205 determines that the operational state of the electronic apparatus 200 is the state A, the predetermined value B to be transmitted to the power supply apparatus 100 as a response relating to the sixth command is equal to or greater than 50% and less than 60%.

If the CPU 205 determines that the operational state of the electronic apparatus 200 is the state B, the predetermined value B to be transmitted to the power supply apparatus 100 as a response relating to the sixth command is equal to or greater than 60% and less than 65%.

If the CPU 205 determines that the operational state of the electronic apparatus 200 is the state C, the predetermined value B to be transmitted to the power supply apparatus 100 as a response relating to the sixth command is equal to 65%.

If the CPU 205 determines that the operational state of the electronic apparatus 200 is the state D, the predetermined value B to be transmitted to the power supply apparatus 100 as a response relating to the sixth command is equal to or greater than 50% and less than 65%.

The CPU 205 detects the predetermined value B based on the power consumed by the electronic apparatus 200 and the load table.

However, the CPU 205 can detect the predetermined value B based on the operational state of the electronic apparatus 200 and the load table. In this case, the CPU 205 detects whether power is supplied from the regulator 208 to each unit of the electronic apparatus 200 and detects the operational state of the electronic apparatus 200 based on a detection result.

When the predetermined value B is detected by the CPU 205, the CPU 205 controls the modulation and demodulation circuit 204 so as to perform load modulation for transmitting the detected predetermined value B to the power supply apparatus 100 as a response relating to the sixth command.

In step S1105, the CPU 105 determines whether the modulation and demodulation circuit 104 has received the predetermined value B as response relating to the sixth command transmitted to the electronic apparatus 200 in step S1104.

If the CPU 105 determines that the modulation and demodulation circuit 104 has received the predetermined value B (YES in step S1105), the CPU 105 records the predetermined value B supplied from the modulation and demodulation circuit 104 in the RAM 107. In this case (YES in step S1105), the process proceeds from step S1105 to step S1106.

If the CPU 105 determines that the modulation and demodulation circuit 104 has not received the predetermined value B (NO in step S1105), the CPU 105 determines that the predetermined value B cannot be acquired. In this case (NO in step S1105), the CPU 105 terminates the process of the flowchart illustrated in FIG. 11. The process proceeds to step S1010 of the detection process illustrated in FIG. 10. In this case (NO in step S1105), the CPU 105 cannot acquire the predetermined value B to be used in the process of step S1007. Therefore, the CPU 105 cannot detect a foreign object based on the power supply efficiency although the CPU 105 can detect a foreign object based on the VSWR.

In step S1106, the CPU 105 controls the matching circuit 103 and the modulation and demodulation circuit 104 so as to transmit the eighth command requesting the charge information to the electronic apparatus 200. In this case, the process proceeds from step S1106 to step S1107.

In step S1107, the CPU 105 determines whether the modulation and demodulation circuit 104 has received the charge information of the electronic apparatus 200 as a response relating to the eighth command transmitted to the electronic apparatus 200 in step S1106.

If the CPU 105 determines that the modulation and demodulation circuit 104 has received the charge information of the electronic apparatus 200 (YES in step S1107), the CPU 105 records the charge information of the electronic apparatus 200 in the RAM 107. In this case (YES in step S1107), the process proceeds from step S1107 to step S1108.

Figure 11:
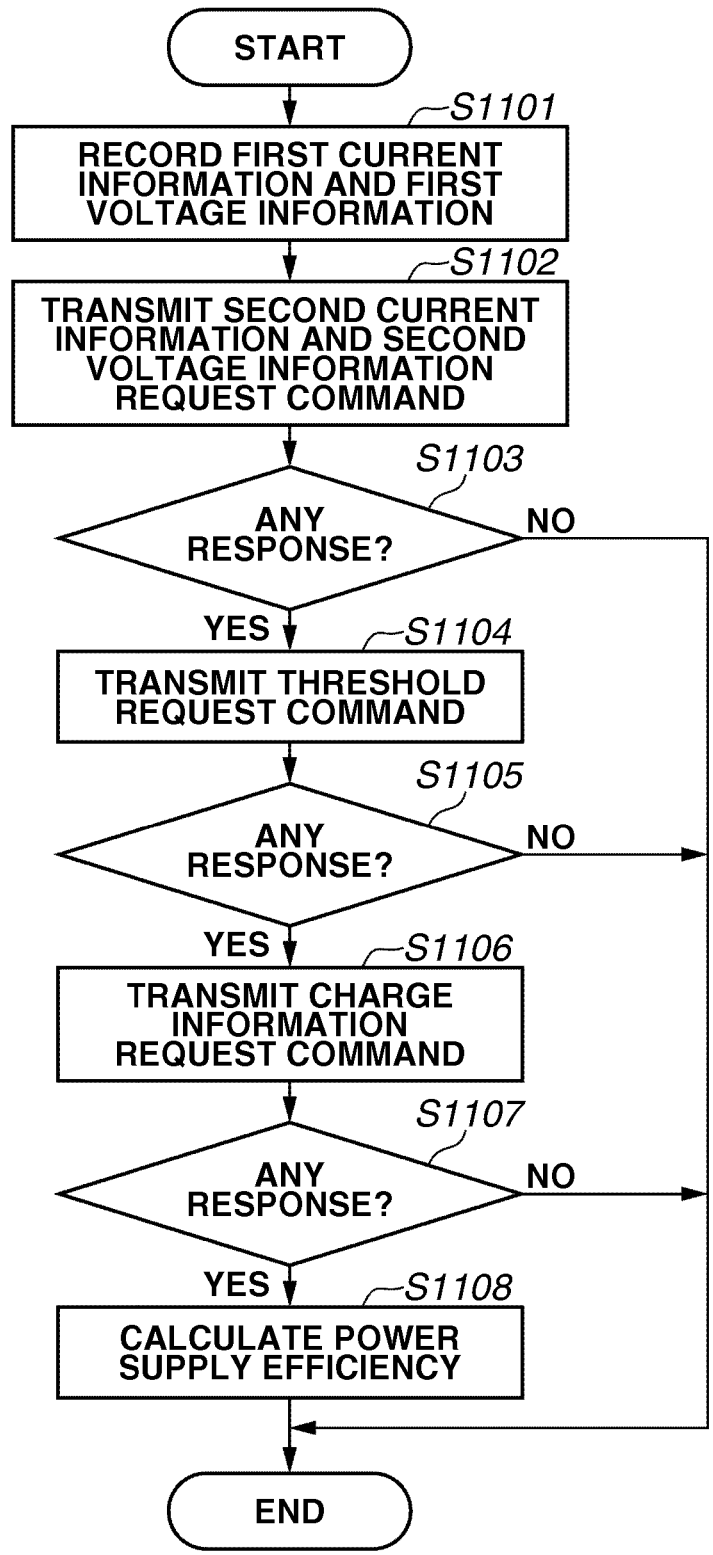
FIG. 11 is a flowchart illustrating power supply efficiency acquisition process that is performed by the power supply apparatus according to the second exemplary embodiment.

If the CPU 105 determines that the modulation and demodulation circuit 104 has not received the charge information of the electronic apparatus 200 (NO in step S1107), the CPU 105 terminates the process of the flowchart illustrated in FIG. 11. The process proceeds to step S1010 of the detection process illustrated in FIG. 10.

In step S1108, the CPU 105 calculates the power supply efficiency of the power supply apparatus 100 based on the first current information and the first voltage information stored in the RAM 107 in step S1101 and based on the second current information and the second voltage information acquired in step S1103.

After the power supply efficiency of the power supply apparatus 100 is stored in the RAM 107, the CPU 105 terminates the process of the flowchart illustrated in FIG. 11.

The CPU 205 detects the predetermined value B based on information indicating the power consumed by the electronic apparatus 200 and the load table. However, the power supply efficiency may decrease depending on the orientation of the electronic apparatus 200. Therefore, the CPU 205 can correct the predetermined value B based on the orientation information of the electronic apparatus 200 when the predetermined value B is detected based on the information indicating the power consumed by the electronic apparatus 200 and the load table.

The power supply efficiency decreases when it is detected that the surface of the electronic apparatus 200 attached to the power receiving antenna 201 is inclined to the surface of the power supply apparatus 100 attached to the power supply antenna 108 by the orientation sensor 216.

For example, the power supply efficiency varies if the inclination between the surface of the electronic apparatus 200 and the surface of the power supply apparatus 100 changes from 10 degrees to 30 degrees.

Therefore, before the CPU 205 transmits the predetermined value B detected based on the load table to the power supply apparatus 100, the CPU 205 can acquire the orientation information of the electronic apparatus 200 and can correct the predetermined value B based on the orientation information of the electronic apparatus 200 and a correction table. In the correction table, the orientation information of the electronic apparatus 200 is associated with a correction value that corresponds to the predetermined value B. The correction table is stored beforehand in the ROM 206.

As described above, if the change amount of the VSWR is equal to or greater than the predetermined value A (YES in step S1006), the power supply apparatus 100 according to the second exemplary embodiment determines that a foreign object exists in the predetermined range even when the power supply apparatus 100 is supplying power to an electronic apparatus identified as the predetermined apparatus.

Further, if the power supply efficiency is less than the predetermined value B (NO in step S1007), the power supply apparatus 100 determines that a foreign object exists in the predetermined range even when the power supply apparatus 100 is supplying power to an electronic apparatus identified as the predetermined apparatus.

Thus, when the power supply apparatus 100 performs power supply process, the power supply apparatus 100 whether a foreign object exists in the predetermined range by performing the process for detecting the foreign object based on the VSWR and the process for detecting the foreign object based on the power supply efficiency.

Therefore, if the power supply apparatus 100 detects a foreign object existing in the predetermined range, the power supply apparatus 100 can stop the power supply process to prevent power from being supplied to a foreign object. Further, if the power supply apparatus 100 does not detect any foreign object in the predetermined range, the power supply apparatus 100 can continuously supply power to the electronic apparatus identified as the predetermined apparatus.

Accordingly, the power supply apparatus 100 can detect a foreign object and can perform power supply process appropriately based on a detection result of the foreign object.

When the power supply apparatus 100 according to the second exemplary embodiment performs process similar to that described in the first exemplary embodiment, the power supply apparatus 100 can obtain effects similar to those described in the first exemplary embodiment.

Further, the electronic apparatus 200 according to the second exemplary embodiment detects the predetermined value B based on the power consumed by to the electronic apparatus 200. Further, the power supply apparatus 100 performs the foreign object detection based on a comparison between the predetermined value B corresponding to the power consumed by to the electronic apparatus 200 and the power supply efficiency. Therefore, the power supply apparatus 100 can detect a foreign object accurately even when the power supply apparatus 100 is supplying power to the electronic apparatus 200.

In step S1007, the CPU 105 compares the predetermined value B acquired from the electronic apparatus 200 with the power supply efficiency calculated in step S1108. However, the predetermined value B can be acquired based on any information that the CPU 105 has acquired from the electronic apparatus 200.

As described in the first exemplary embodiment and the second exemplary embodiment, the CPU 105 detects a foreign object based on a comparison between the change amount of the VSWR and the predetermined value A in step S508, step S707, and step S1006. However, the CPU 105 can detect a foreign object based on a comparison between a change amount of a standing wave ratio (SWR) and a threshold value relating to the SWR in step S508, step S707, and step S1006.

The power supply apparatus according to the present invention is not limited to the power supply apparatus 100 described in the first exemplary embodiment or the second exemplary embodiment. Further, the electronic apparatus according to the present invention is not limited to the electronic apparatus 200 described in the first exemplary embodiment or the second exemplary embodiment. For example, the power supply apparatus 100 and the electronic apparatus 200 according to the present invention can be realized by a system including a plurality of apparatuses.

Further, various processing and functions described in the first exemplary embodiment or the second exemplary embodiment can be realized by a computer program. In this case, a computer (including CPU) can execute the computer program to realize the functions described in the first exemplary embodiment or the second exemplary embodiment.

The computer program according to the present invention can use the operating system (OS) running on the computer to realize various processing and functions described in the first exemplary embodiment.

The computer program according to the present invention can be read from a computer readable recording medium and can be executed by a computer. The computer readable recording medium is, for example, a hard disk drive, an optical disk, a compact disk read only memory (CD-ROM), a compact disk recordable (CD-R), a memory card, or a ROM. Further, it is useful that an external apparatus supplies the computer program according to the present invention to the computer via a communication interface and the computer executes the supplied program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-027539 filed Feb. 10, 2011, which is hereby incorporated by reference herein in its entirety.

What is claimed is:

1. A power output apparatus comprising:
   an output unit that wirelessly outputs power to an electronic apparatus; and
   a control unit that performs at least one of a first process and a second process, wherein the first process includes a process for determining whether a change of a value, relating to a traveling wave of power output by the output unit and a reflected wave of power output by the output unit, is equal to or more than a first predetermined value, wherein the second process includes a process for determining whether an efficiency is equal to or more than a second predetermined value, wherein the efficiency is obtained according to power output by the power output unit and power received by the electronic apparatus, and
   wherein the control unit causes the output unit to output charging power for causing the electronic apparatus to charge a battery in response to a change of a value, relating to a traveling wave of power output by the output unit and a reflected wave of power output by the output unit, not being equal to or more than the first predetermined value and the efficiency being equal to or more than the second predetermined value.

2. The power output apparatus according to claim 1, wherein the control unit performs a process for informing an existence of a foreign object in response to a change of a value, relating to a traveling wave of power output by the output unit and a reflected wave of power output by the output unit, being equal to or more than the first predetermined value.

3. The power output apparatus according to claim 1, wherein the control unit performs a process for informing an existence of a foreign object in response to the efficiency being not equal to or more than the second predetermined value.

4. The power output apparatus according to claim 1, wherein the control unit performs a process for restricting power output from the output unit in response to change of a value, relating to a traveling wave of power output by the output unit and a reflected wave of power output by the output unit, being equal to or more than the first predetermined value.

5. The power supply apparatus according to claim 1, wherein the control unit performs a process for restricting power output from the output unit in response to the efficiency not being equal to or more than the second predetermined value.

6. The power output apparatus according to claim 1, further comprising a communication unit that communicates with the electronic apparatus wirelessly, wherein the control unit performs at least one of the first process and the second process until the charging power is output from the output unit since information for identifying the electronic apparatus is received by the communication unit.

7. The power output apparatus according to claim 1, wherein the control unit performs at least one of the first process and the second process until the charging power is output from the output unit after the control unit determines that the electronic apparatus can receive power output from the output unit.

8. The power output apparatus according to claim 1, wherein the control unit causes the output unit to output power that is less than the charging power to obtain the efficiency.

9. The power output apparatus according to claim 1, wherein a value, relating to a traveling wave of power output by the output unit and a reflected wave of power output by the output unit, is a value indicating a voltage standing wave ratio (VSWR).

10. The power output apparatus according to claim 1, wherein a value, relating to a traveling wave of power output by the output unit and a reflected wave of power output by the output unit, is a value indicating a standing wave ratio (SWR).

11. A method for controlling a power output apparatus, the method comprising:
    performing at least one of a first process and a second process, wherein the first process includes a process for determining whether a change of a value, relating to a traveling wave of power output by the power output apparatus and a reflected wave of power output by the power output apparatus, is equal to or more than a first predetermined value, wherein the second process includes a process for determining whether an efficiency is equal to or more than a second predetermined value, wherein the efficiency is obtained according to power output by the power output apparatus and power received by the electronic apparatus; and
    outputting charging power for causing the electronic apparatus to charge a battery in response to a change of a value, relating to a traveling wave of power output by the power output apparatus and a reflected wave of power output by the power output apparatus, not being equal to or more than the first predetermined value and the efficiency being equal to or more than the second predetermined value.

12. The method according to claim 11, further comprising performing a process for informing an existence of a foreign object in response to a change of a value, relating to a traveling wave of power output by the power output apparatus and a reflected wave of power output by the power output apparatus, being equal to or more than the first predetermined value.

13. The method according to claim 11, further comprising performing a process for informing an existence of a foreign object in response to the efficiency not being equal to or more than the second predetermined value.

14. The method according to claim 11, further comprising performing a process for restricting power output from the power output apparatus unit in response to a change of a value, relating to a traveling wave of power output by the power output apparatus and a reflected wave of power output by the power output apparatus, being equal to or more than the first predetermined value.

15. The method according to claim 11, further comprising performing a process for restricting power output from the power output apparatus in response to the efficiency not being equal to or more than the second predetermined value.

16. The method according to claim 11, further comprising communicating with the electronic apparatus wirelessly, and
performing at least one of the first process and the second process until the charging power is output from the power output apparatus since information for identifying the electronic apparatus is received from the electronic apparatus.

17. The method according to claim 11, further comprising performing at least one of the first process and the second process until the charging power is output from the power output apparatus after it is determined that the electronic apparatus can receive power output from the power output apparatus.

18. The method according to claim 11, further comprising outputting power that is less than the charging power to obtain the efficiency.

19. The method according to claim 11, wherein the value, relating to a traveling wave of power output by the power output apparatus and a reflected wave of power output by the power output apparatus, is a value indicating a voltage standing wave ratio (VSWR).

20. The method according to claim 11, wherein the value, relating to a traveling wave of power output by the power output apparatus and a reflected wave of power output by the power output apparatus, is a value indicating a standing wave ratio (SWR).

21. A non-transitory computer-readable storage medium storing a program that causes a computer to perform a method for controlling a power output apparatus, the method comprising:
performing at least one of a first process and a second process, wherein the first process includes a process for determining whether a change of a value, relating to a traveling wave of power output by the power output apparatus and a reflected wave of power output by the power output apparatus, is equal to or more than a first predetermined value, wherein the second process includes a process for determining whether an efficiency is equal to or more than a second predetermined value, wherein the efficiency is obtained according to power output by the power output apparatus and power received by the electronic apparatus; and
outputting charging power for causing the electronic apparatus to charge a battery in response to change of a value, relating to a traveling wave of power output by the power output apparatus and a reflected wave of power output by the power output apparatus, not being equal to or more than the first predetermined value and the efficiency being equal to or more than the second predetermined value.

22. A power output apparatus comprising:
an output unit that wirelessly outputs power to an electronic apparatus; and
a control unit that receives information of power received by the electronic apparatus from the electronic apparatus via an antenna,
wherein the control unit performs at least one of a first process and a second process, wherein the first process includes a process for determining whether a change of a value, relating to a traveling wave of power output by the output unit and a reflected wave of power output by the output unit, is equal to or more than a first predetermined value, wherein the second process includes a process for determining whether an efficiency is equal to or more than a second predetermined value, wherein the efficiency is obtained according to power output by the power output unit and the power received by the electronic apparatus, and
wherein the control unit causes the output unit to output charging power for causing the electronic apparatus to charge a battery if a change of a value, relating to a traveling wave of power output by the output unit and a reflected wave of power output by the output unit, is not equal to or more than the first predetermined value and the efficiency is equal to or more than the second predetermined value.

23. The power supply apparatus according to claim 22, wherein the antenna is shared for outputting power and receiving information of power received by the electronic apparatus.

* * * * *